US012488683B2

(12) United States Patent
Large et al.

(10) Patent No.: US 12,488,683 B2
(45) Date of Patent: Dec. 2, 2025

(54) DISTRIBUTED ACOUSTIC SENSING OF TRAFFIC

(71) Applicant: FOTECH GROUP LIMITED, Church Crookham (GB)

(72) Inventors: Stuart Large, Church Crookham (GB); Matt McDonald, Calgary (CA)

(73) Assignee: VIAVI SOLUTIONS INC., Chandler, AZ (US)

( * ) Notice: Subject to any disclaimer, the term of this patent is extended or adjusted under 35 U.S.C. 154(b) by 248 days.

(21) Appl. No.: 18/265,385

(22) PCT Filed: Dec. 4, 2020

(86) PCT No.: PCT/GB2020/053127

§ 371 (c)(1),
(2) Date: Jun. 5, 2023

(87) PCT Pub. No.: WO2022/117977

PCT Pub. Date: Jun. 9, 2022

(65) Prior Publication Data

US 2024/0046784 A1 Feb. 8, 2024

(51) Int. Cl.
*G08G 1/00* (2006.01)
*G08G 1/01* (2006.01)
(Continued)

(52) U.S. Cl.
CPC ............. *G08G 1/04* (2013.01); *G08G 1/0145* (2013.01); *G08G 1/052* (2013.01); *G08G 1/08* (2013.01)

(58) Field of Classification Search
CPC ........ G08G 1/04; G08G 1/0145; G08G 1/052; G08G 1/08; G08G 1/082; G08G 1/02; G08G 1/0116; G08G 1/00
(Continued)

(56) References Cited

U.S. PATENT DOCUMENTS

2016/0155334 A1 6/2016 Jansson et al.
2017/0053529 A1* 2/2017 Yokoyama ........... G08G 1/0145
2018/0342156 A1* 11/2018 Martin ................... G08G 1/052

FOREIGN PATENT DOCUMENTS

EP 3369085 A1 9/2018

OTHER PUBLICATIONS

International Search Report and Written Opinion dated Sep. 13, 2021, PCT Patent Application No. PCT/GB2020/053127, filed Dec. 4, 2020, European Patent Office.

(Continued)

*Primary Examiner* — Shardul D Patel
(74) *Attorney, Agent, or Firm* — Mannava & Kang, P.C.

(57) ABSTRACT

Methods and apparatus for estimating a position of a boundary of a queue of traffic are disclosed, the queue extending along a roadway. Distributed acoustic sensing is used to generate, as a function of time and of position along the roadway, a signal representing acoustic vibration at a sensing optical fibre that extends along the roadway. A queue signature is detected in the signal of either the slowing down of a plurality of vehicles as they approach the boundary of the queue, or speeding up of a plurality of vehicles as they advance from the departed boundary of the queue. A position of the boundary of the queue is then estimated from the detected queue signature. Methods and apparatus are also disclosed for controlling one or more road traffic signals by using distributed acoustic sensing to detect acoustic vibration at one or more sensing optical fibres disposed along a roadway, as a function of time and of position along a roadway, and controlling the one or more road traffic signals responsive to the detected acoustic vibration.

21 Claims, 12 Drawing Sheets

(51) Int. Cl.
*G08G 1/04* (2006.01)
*G08G 1/052* (2006.01)
*G08G 1/08* (2006.01)

(58) Field of Classification Search
USPC .......................................................... 701/117
See application file for complete search history.

(56) References Cited

OTHER PUBLICATIONS

B. Barbagli et al., "A Distributed Sensor Network for Real-Time Acoustic Traffic Monitoring and Early Queue Detection", 2010 Fourth International Conference on Sensor Technologies and Applications, IEEE, Piscataway, NJ, USA, Jul. 18, 2010 (Jul. 18, 2010), pp. 173-178, XP031739490, ISBN: 978-1-4244-7538-4.

* cited by examiner

DISTRIBUTED ACOUSTIC SENSING OF TRAFFIC

CLAIM FOR PRIORITY

The present application is a national stage filing under 35 U.S.C 371 of PCT application number PCT/GB2020/053127, having an international filing date of Dec. 4, 2020, the disclosure of which is hereby incorporated by reference in its entirety.

The present disclosure relates to methods and apparatus for sensing or monitoring traffic using a distributed optical fibre sensor, for example for detecting and monitoring traffic queues and properties of such traffic queues such as back and front boundaries of such queues.

INTRODUCTION

The sensing and monitoring of traffic and traffic conditions is carried out in a variety of ways in the prior art, for example using inductive loops buried in road surfaces, radar based detectors, and video cameras. However, these sensors tend to detect the passing of vehicles at either a single point or along a rather limited stretch of roadway, which makes the detection and monitoring of more dynamic and extended traffic features such as traffic queues challenging.

It would be desirable to address problems and limitations of the related prior art.

SUMMARY OF THE INVENTION

A number of techniques for automatically detecting, and optionally also controlling aspects of traffic and traffic flow are described, making use of distributed optical fibre sensing or more particularly distributed acoustic sensing along one or more roadways, within one or more road junctions, and so forth. Such distributed acoustic sensing may be combined with other traffic sensing techniques such as the use of video cameras, induction loops, radar and so forth to further enhance the described capabilities.

In particular, the invention provides a method of automatically estimating a position of a boundary of a queue of vehicles or traffic, the queue extending along a roadway or carriageway, comprising: generating a signal representing vibration, or more particularly acoustic vibration or vibrational noise, at a sensing optical fibre that extends along the roadway; detecting, in the signal, a queue signature of either the slowing down of a plurality of vehicles as they approach a boundary of the queue, or speeding up of a plurality of vehicles as they advance from a departed boundary of the queue; and estimating the position of a boundary of the queue from the detected queue signature. The boundary may be in particular either or both of front and/or rear boundaries, or indeed the physical extent of a traffic queue.

The signal representing vibration, or physical vibration, may be generated using various distributed optical fibre sensing techniques, and in particular distributed acoustic sensing, typically as a function of time and of position along the roadway. The distributed acoustic sensing may make use of Rayleigh backscatter of probe light pulses launched into the sensing optical fibre, but other techniques may be used.

Acoustic vibration may be understood as physical vibrations in the acoustic regime, for example at least comprising vibrations at frequencies above about 1 Hz or above about Hz (but other definitions may be used), where the detected vibration is suitable for detecting vehicles as they move along the road, and preferably for detecting individual vehicles for example in terms of their position, speed and so forth.

It is not necessary that the generated signal accurately represents the detected vibration at multiple particular frequencies or frequency ranges, as long as the signal is suitable for the described purposes of vehicle detection. For example, the generated signal could be a signal representing total vibrational power or intensity detected using the sensing optical fibre at any particular location and time, or some other simplified measure of vibration.

The sensing optical fibre may be disposed along the roadway in various ways, for example being buried in the material of the roadway itself, mounted to or above the roadway, disposed alongside the road, and so forth, The sensing optical fibre need not have been provided originally for the present purposes—for example optical fibres installed for data network and telecommunications may also be used.

The boundary for which the position is estimated may be a back boundary of the queue, and the queue signature is then a queue signature of the plurality of vehicles slowing down as they approach the back boundary, or the boundary may be a front boundary of the queue, and the queue signature is then a queue signature of the plurality of vehicles speeding up as they depart from the front boundary.

Detecting the queue signature may comprise detecting properties of tracks within the acoustic signal, that is tracks which each correspond to the progress of one vehicle, or perhaps two or more closely positioned vehicles, progressing along the roadway. Each track then results from one or more vehicles which are slowing down as they approach the back boundary of the queue, or which are speeding up as they advance following departure from the front boundary of the queue.

Notably, at least some of the tracks may terminate or become undetectable or indeterminate before the associated vehicles reach the approached boundary of the queue, or start or become detectable only after the associated vehicles have advanced from the departed boundary of the queue. This is because the low vehicle speeds within these regimes may lead to very low levels of detectable vehicle noise. This may be especially the case with electric vehicles for example which do not generate significant mechanical engine noise, and less so with those heavy goods vehicles which have large internal combustion engines.

Estimating the position of the boundary of the queue may comprise extrapolation of the detected queue signature forwards to the approached boundary of the queue, or backwards to the departed boundary of the queue. This extrapolation can then be used to overcome the absence of vehicle noise at low speeds close to the queue boundaries. Of course, there may typically be some slow vehicle movement within the queue, and the extrapolations used may allow for this in determining suitable queue boundaries.

Typically, the position of the boundary of the queue will move over time as the queue forms, extends, dissipates, or otherwise changes, and typically therefore the method estimates the position of the boundary as a function of time, to thereby form an actual, or trajectory of the, boundary of the queue, and optionally to form a future estimate of such a trajectory. If both front and back boundaries are detected, the determined and/or estimated future trajectories may also or instead comprise for example a length of the queue in terms of physical distance along the roadway, or estimated dwell time of each vehicle within the queue.

Detecting the queue signature may comprise determining that at least a portion of the detected vibration signal satisfies a queue boundary model. This may comprise detecting in the signal a separate track caused by each of a plurality of vehicles, wherein detecting the queue signature comprises determining that at least portions of these tracks satisfy the queue boundary model.

Alternatively, this may comprise determining composite movement data for the plurality of vehicles from the signal, wherein detecting the queue signature comprises determining that a portion of the composite movement data satisfies a queue boundary model. Such composite movement data will typically be such that movements or tracks of individual vehicles are not discernible or represented in such data, and such composite movement data may be conveniently derived from the vibration signal using filters or statistical methods which avoid the need to identify and follow separate vehicle tracks.

For example, the composite movement data may comprise traffic speed data as a function of time for each of a plurality of locations along the roadway. The composite movement data may be determined by applying one or more filters to the acoustic signal.

Whether or not composite movement data is used, the queue boundary model may define one or more patterns of speed change of vehicles approaching, and/or advancing from, the boundary of the queue to be met for queue signature to be detected.

Rather than requiring composite movement data as discussed above, the queue boundary model may define one or more patterns of tracks terminating as vehicles approach, and/or initiating as vehicles advance from, the boundary of the queue, for a queue signature to be detected, each track typically corresponding to a different vehicle or small group of closely spaced vehicles. The queue boundary model may define one or more patterns of similarity between tracks of vehicles approaching, and/or advancing from, the boundary of the queue, for a queue signature to be detected.

The estimated queue boundaries or other queue properties such as queue length or duration may be used for various purposes. For example, the method may further comprise automatically controlling one or more road traffic signals responsive to the estimated position of the boundary of the queue of traffic.

For example, such road traffic signals may be arranged to permit or forbid traffic to pass the one or more road traffic signals, typically using red, green, and in many countries an additional colour of lights, using an estimated position of the boundary of the traffic queue which is the estimated position of a back boundary of the queue of traffic which is waiting to pass the one or more road traffic signals. Controlling the one or more road traffic signals using estimated queue boundaries thereby permits an increased number of vehicles to pass the road traffic signals in response to an increased length of the queue of traffic.

Other examples comprise automatically controlling a road traffic sign to display a warning to traffic which is travelling along the roadway towards the estimated position of a back boundary of the queue of traffic.

Other examples comprise automatically detecting the presence of a stranded vehicle at least in part using one or more estimated positions of boundaries of the queue of traffic, when the queue of traffic is caused by, or has a front boundary proximal to, the stranded vehicle.

The invention also provides a method of controlling one or more road traffic signals, comprising: using distributed sensing to detect vibration or acoustic vibration at one or more sensing optical fibres disposed along a roadway, as a function of time and of position along a roadway; and controlling the one or more road traffic signals responsive to the detected acoustic vibration.

The signal representing the detected acoustic vibration may be used to estimate one or more properties of a queue of traffic proximal to or approaching the one or more road traffic signals along the roadway, and one or more road traffic signals may then be controlled responsive to the one or more estimated properties of the queue of traffic.

The signal representing the detected acoustic vibration may be used to determine a trajectory of a vehicle approaching a road junction along a first roadway, and it may then be determined whether the trajectory meets a danger condition, indicative that the vehicle is expected to enter the junction in contravention of at least one of the road traffic signals. If such a vehicle trajectory is detected then the one or more of the road traffic signals may be controlled to delay entry of one or more other vehicles onto the junction along at least a second roadway. This technique can be used for example to detect a vehicle expected to traverse a red light or stop signal, and to then delay other traffic from entering the junction for safety purposes.

The invention also provides a method of automatically controlling a road traffic sign, comprising: using distributed optical fibre sensing to detect vibration, in particular acoustic vibration, at one or more sensing optical fibres disposed along a roadway, as a function of time and of position along the roadway; and controlling the road traffic sign to display a warning to traffic which is travelling along the roadway responsive to the detected acoustic vibration. This arrangement can be used to improve road safety by warning drivers of a queue of traffic ahead. In particular, the detected acoustic vibration can be used to estimate one or more properties of a queue of traffic which is ahead of traffic which is passing the road traffic sign, and controlling the road traffic sign responsive to the one or more estimated properties.

The invention also provides a method of detecting a stranded vehicle on a roadway, comprising: using distributed optical fibre sensing, in particular distributed acoustic sensing, to detect vibration or acoustic vibration at one or more sensing optical fibres disposed along a roadway; and detecting a stranded vehicle on the roadway using the detected vibration. In particular, the detected acoustic vibration may be used to estimate one or more properties of a queue of traffic caused by, or having a front boundary proximal to, the stranded vehicle.

Generally, when we refer to the estimated properties of a queue of traffic, these estimated properties may comprise one or more of: a boundary of the queue, a back boundary of the queue, a length of the queue, and an estimated length of time of each vehicle spends in the queue. Such estimated properties may be estimated based on any of the various suitable techniques described herein.

The invention also provides a method of detecting an incident on a roadway, such as a broken down or stopped vehicle or other hazard, comprising: using distributed optical fibre sensing, or more particularly distributed acoustic sensing, to detect vibration or acoustic vibration at one or more sensing optical fibres disposed along a roadway, as a function of time and of position along the roadway; identifying traffic noise, in the detected acoustic vibration, from a series of antecedent vehicles passing a position along the roadway, or more particularly tracks of such vehicles; identifying traffic noise, in the detected acoustic vibration, of a series of subsequent vehicles stopping at or before the position, or more particularly tracks of such vehicles; and identifying the incident as located proximal to the position.

The method may further comprise identifying a reduction or absence of traffic noise or tracks of vehicles in an expanding sector of the roadway subsequent to the incident, the sector expanding away from the position of the incident, and identifying the incident as proximal to the apex or origin of the expanding sector. To this end, the expanding sector may be identified as expanding in both directions along the roadway, but expanding more rapidly in the direction of traffic along the roadway than in the opposite direction.

The invention also provides apparatus corresponding to the above methods. For example, the invention provides apparatus for estimating a position of a back or front boundary of a queue of traffic, the queue extending along a roadway, comprising: an interrogator arranged to generate, as a function of time and of position along the roadway, a signal representing acoustic vibration at one or more sensing optical fibres that extend along the roadway; and a traffic monitor arranged to detect, in the signal, a queue signature of either the slowing down of a plurality of vehicles as they approach the back boundary of the queue, or speeding up of a plurality of vehicles as they advance from the front boundary of the queue, and to estimate the position of the boundary of the queue from the detected queue signature.

Such a traffic monitor may be arranged to detect properties of tracks within the acoustic signal, each track resulting from one or more vehicles which are slowing down as they approach the back boundary of the queue, or which are speeding up as they advance from the front boundary of the queue, wherein at least some of the tracks terminate or become undetectable before the associated vehicles reach the approached boundary of the queue, or start or become detectable only after the associated vehicles have advanced from the front boundary of the queue.

The traffic monitor may be arranged to estimate the position of the boundary of the queue using extrapolation of the detected queue signature forwards to the approached back boundary of the queue, or backwards to the departed front boundary of the queue.

The apparatus may extend to elements or systems relating to traffic control, for example the apparatus may be further arranged to automatically control one or more road traffic signals responsive to the estimated position of the boundary of the queue of traffic, or may be arranged to automatically control a road traffic sign to display a warning to traffic which is travelling along the roadway towards the estimated position of a back boundary of the queue of traffic.

Where method or apparatus aspects are described which require data processing, this may be carried out by one or more suitable computer systems, and such computer systems may be located or distributed in various ways and not necessarily proximal to other aspects of the method or apparatus. The invention also provides one or more computer readable media comprising computer program code arranged to carry out the described methods, when executed one or more suitable computer processors or computer systems. Generally also, the described methods may be implemented automatically using suitable control and/or computer systems.

BRIEF SUMMARY OF THE DRAWINGS

Embodiments of the invention will now be described, by way of example only, with reference to the accompanying drawings of which.

Figure 8:
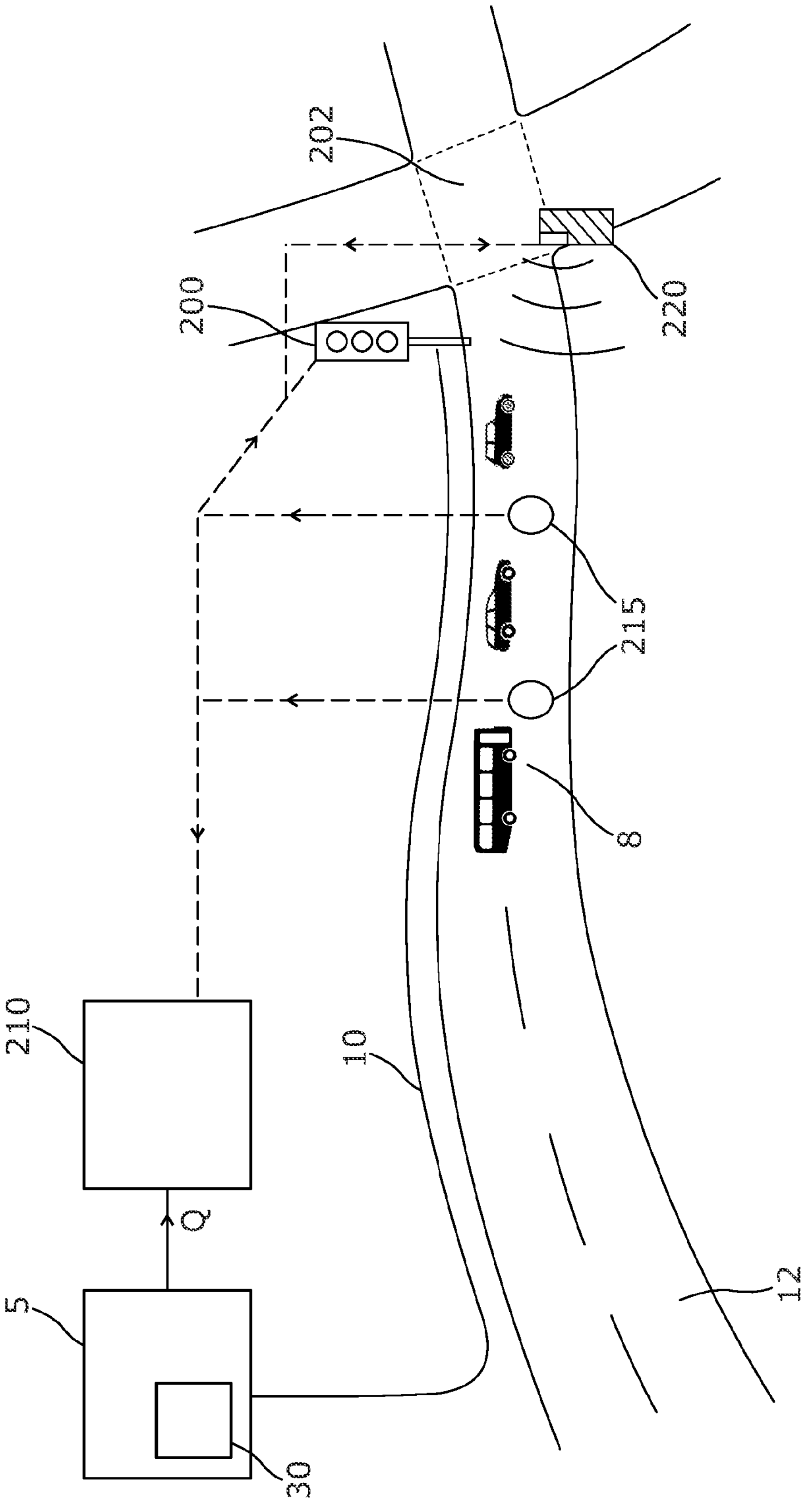
Figure 9:
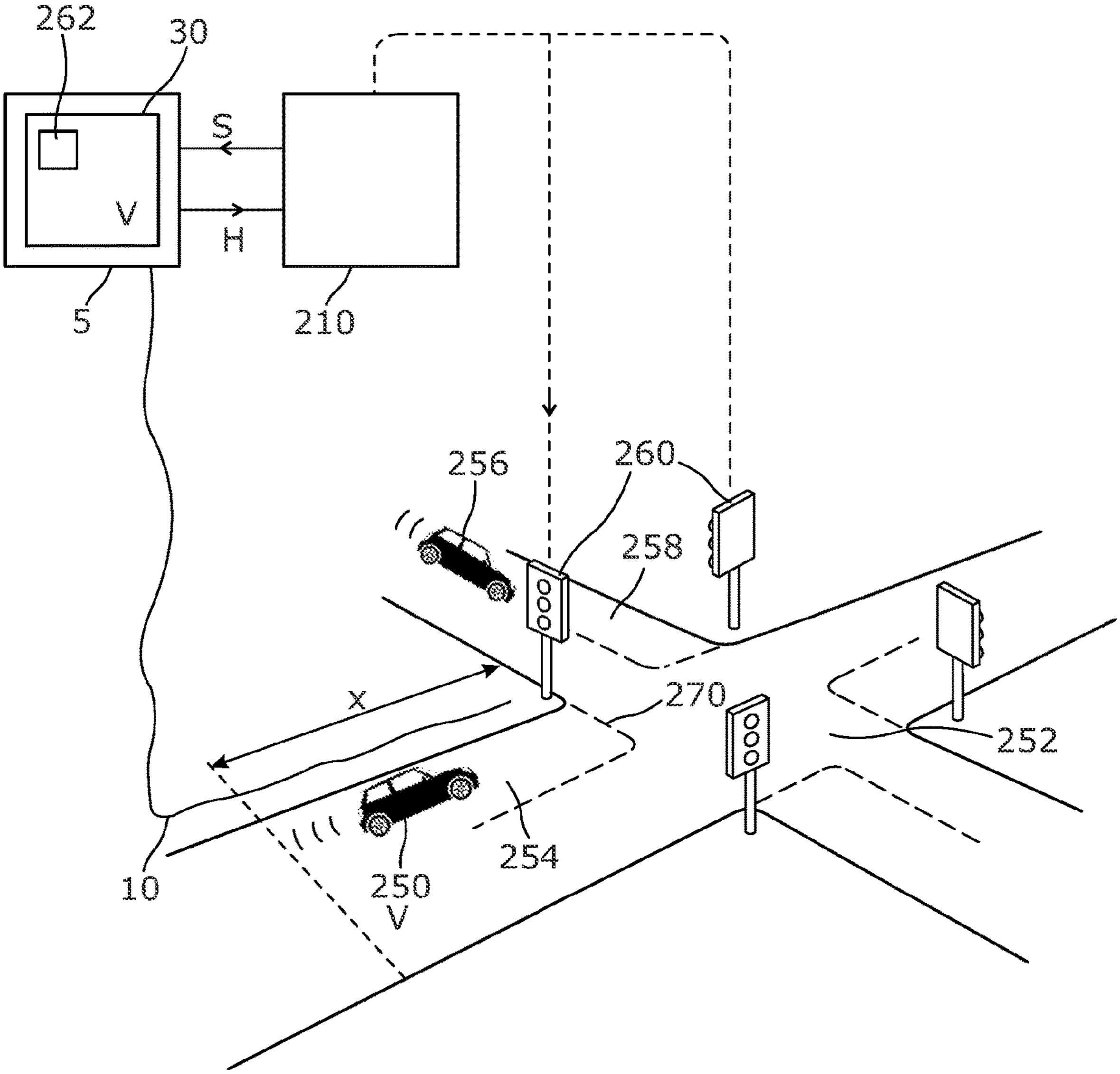
Figure 10:
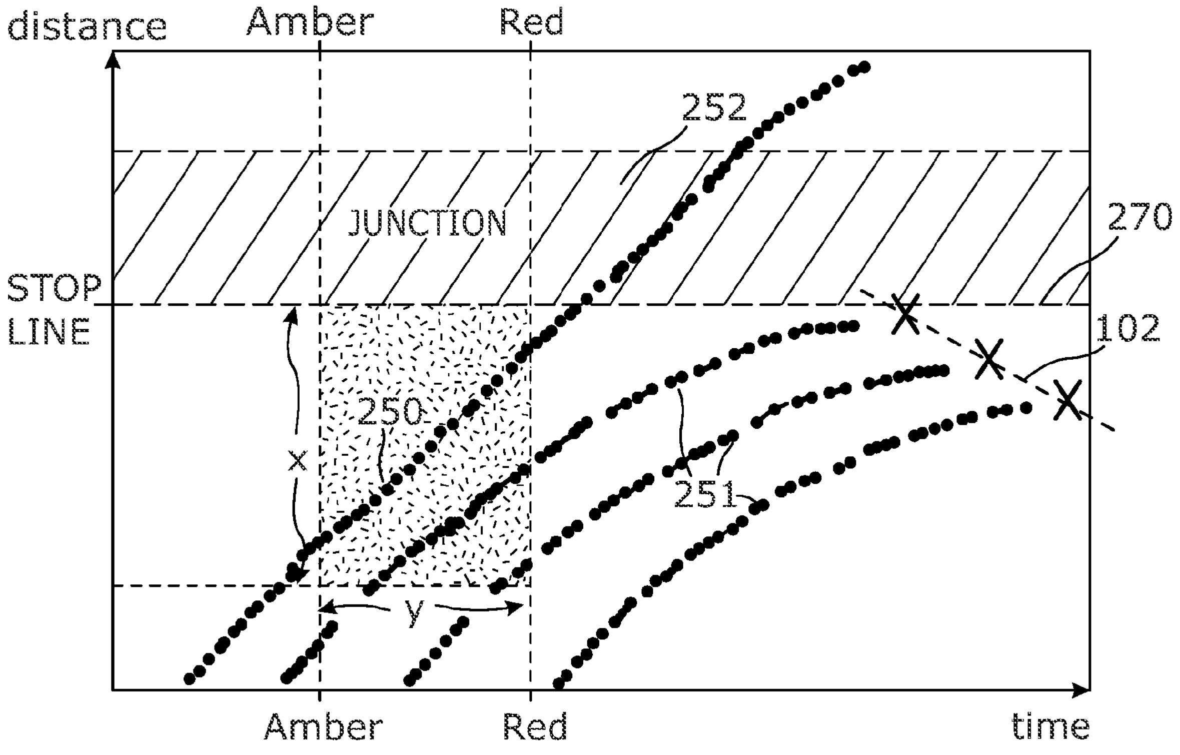
Figure 11:
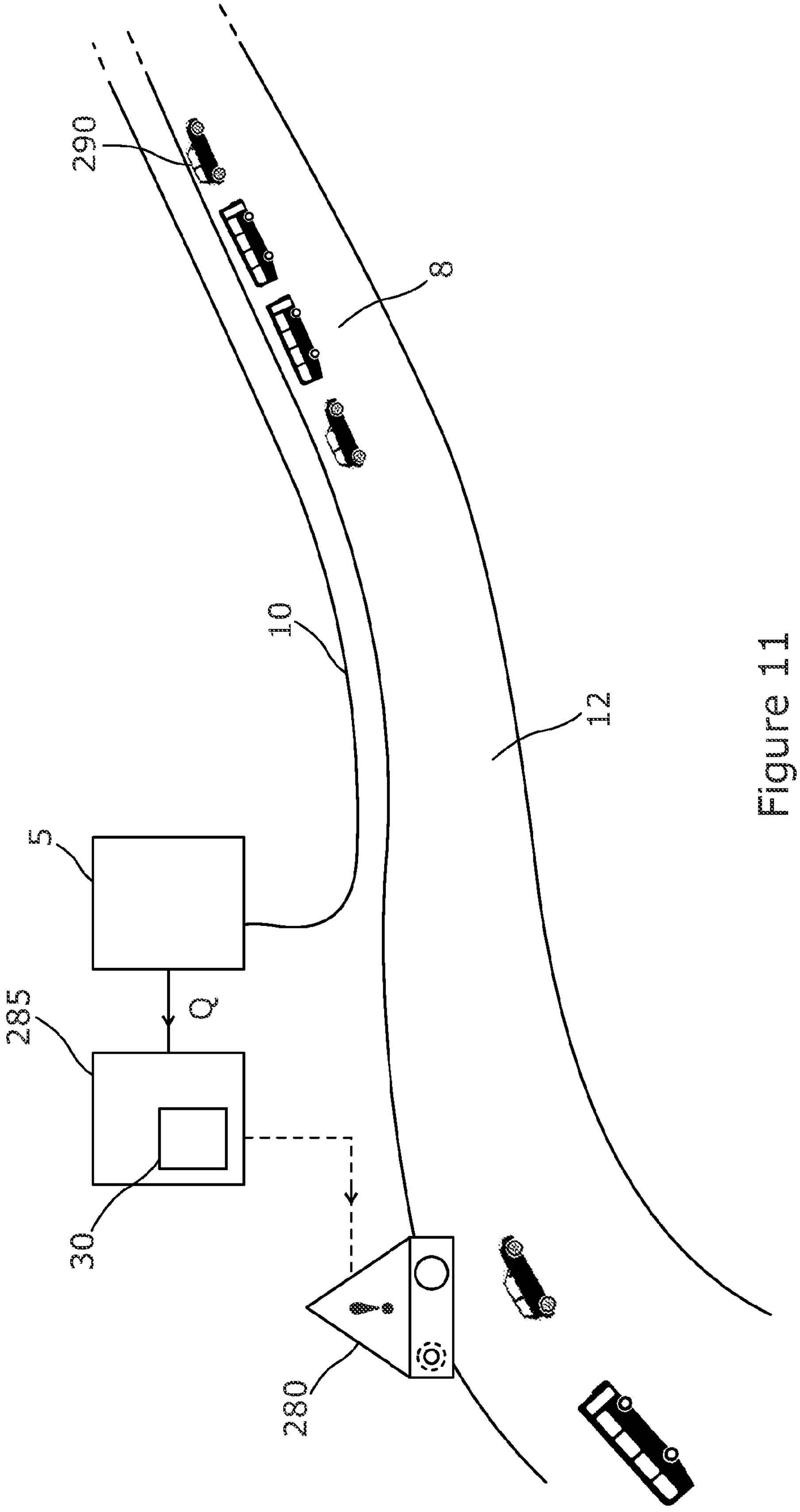
Figure 12:
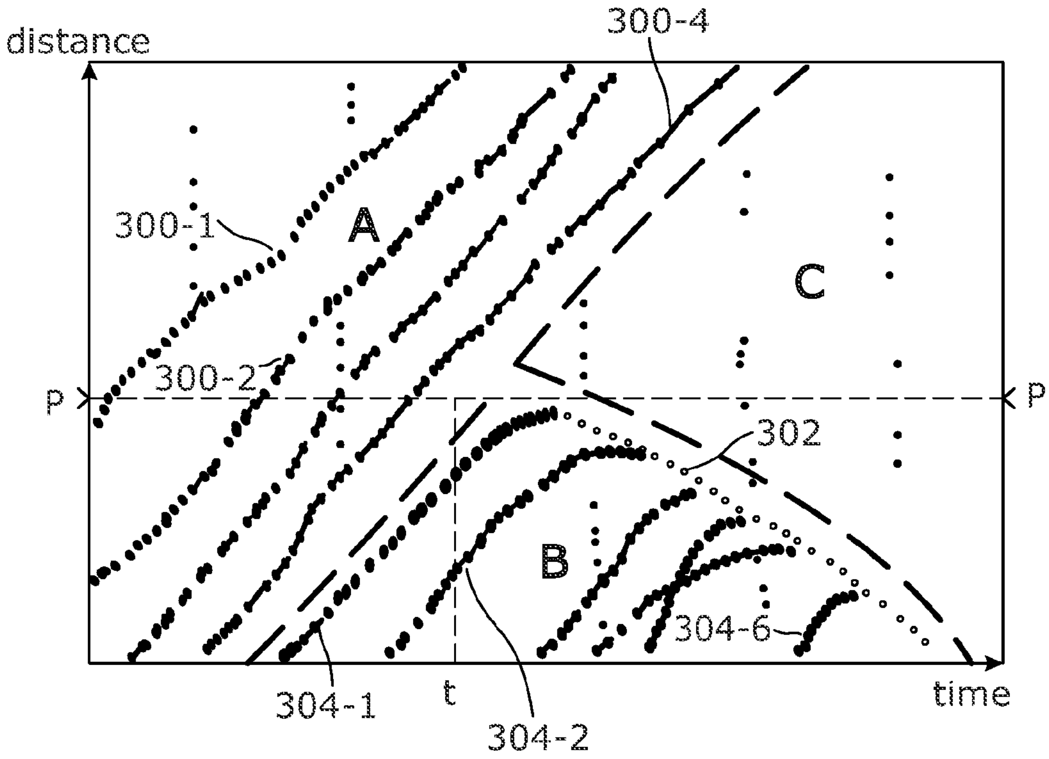

FIGS. **5*a* to 5*c*** show detected acoustic vibration data, the results of a Radon transform applied to that data, and speed and vehicle count data derived from the results of the Radon transform;

FIGS. **6*a* and 6*b*** illustrate aspects of detecting a queue signature, and related properties of the detected queue of traffic, for example from one or more patterns of speed change of vehicles approaching, and/or advancing from, the boundary of the queue;

FIGS. **7*a* and 7*b*** illustrate aspects of detecting a queue signature, and related properties of the detected queue, for example from one or more patterns of similarity between tracks of vehicles approaching, and/or advancing from, the boundary of the queue;

FIG. 8 illustrates control of road traffic signals in response to detected acoustic vibration along a roadway;

FIG. 9 illustrates control of road traffic signals to mitigate dangerous approach of a vehicle towards a junction by suitable detection of that vehicle and control of road traffic signals;

FIG. 10 is a time—distance plot along a roadway which approaches a junction or intersection controlled by traffic signals, of detected acoustic vibration arising from a number of vehicles approaching the junction, including one vehicle which continues in contravention of a stop signal;

FIG. 11 illustrates detection of a stranded vehicle using detection of a consequent traffic queue, and the automatic control of a road traffic sign to provide traffic warnings, in response to detected acoustic vibration along a roadway; and FIG. 12 is a graph of vehicle tracks in detected acoustic vibration along a roadway demonstrating detection of an incident at position P.

DETAILED DESCRIPTION OF EMBODIMENTS

Figure 1:
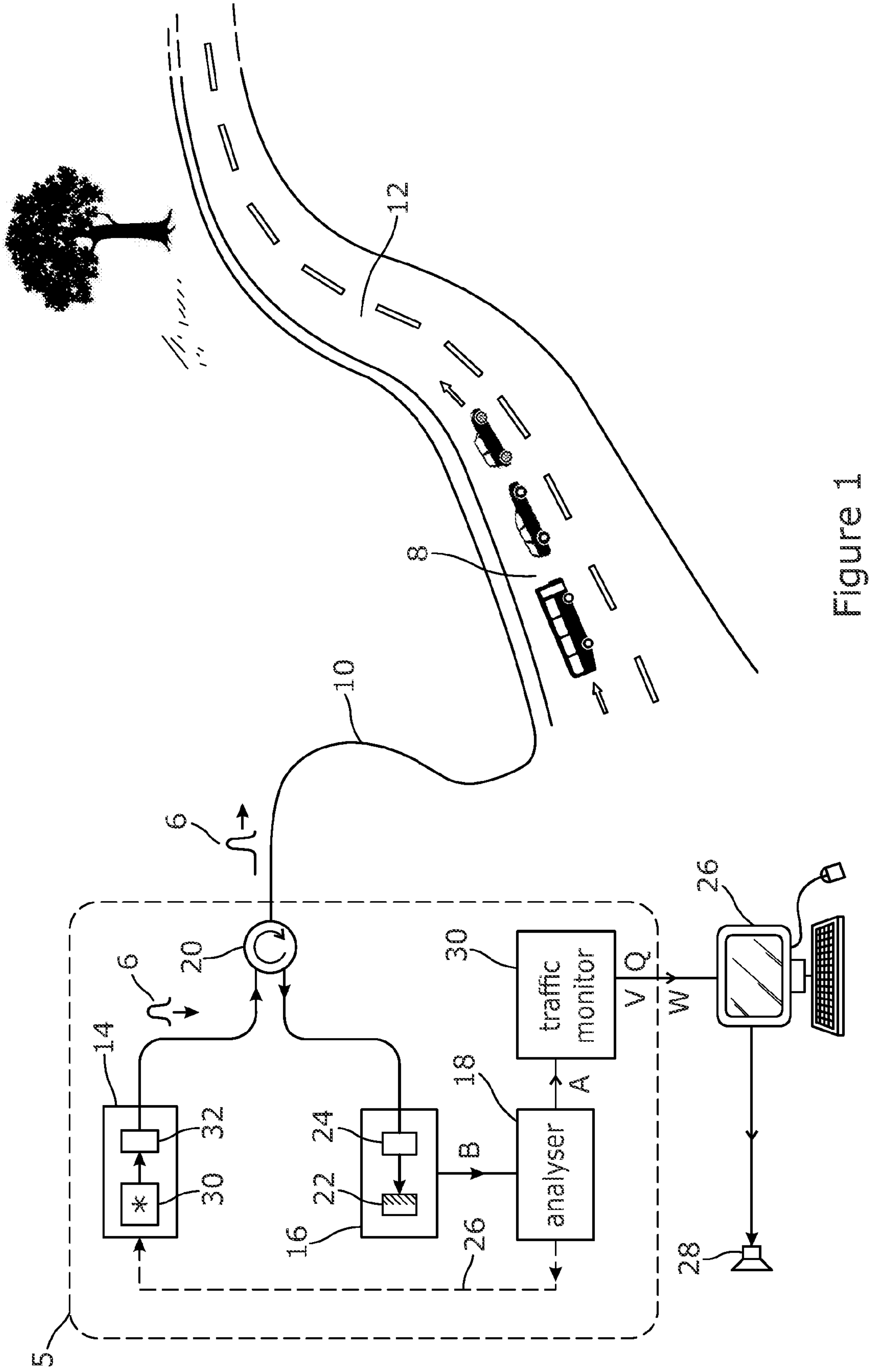
FIG. 1 schematically illustrates the use of distributed acoustic sensing to monitor traffic proceeding along a roadway, for example to detect and monitor properties of queues of such traffic.

Referring to FIG. 1 there is illustrated a distributed optical fibre sensor arranged to sense acoustic vibration as a function of position along a roadway 12, using optical time domain reflectometry, or another reflectometry technique, and in particular using a technique of distributed acoustic sensing. Such a roadway may correspond to the whole of a smaller or larger roadway with single or multiple carriageways in one or both traffic directions, to one or more such particular carriageways, to specific roadway structures such as an on-ramp or off-ramp to or from an expressway or motorway, a ring structure such as a roundabout, and so forth.

Acoustic vibration is sensed using one or more sensing optical fibres 10 which extend along the roadway. These sensing optical fibres 10 may typically be buried in, or buried adjacent to the roadway, for example housed in one or more conduits or cables, so as to extend along the roadway 12. However, in some examples the one or more sensing optical fibres 12 or associated conduits or cables may be affixed to a surface of the roadway, or carried above the roadway or adjacent ground, along or within a wall of a tunnel or cutting through which the roadway passes, affixed to or within a roadway barrier, and/or in other ways. In each situation, the one or more sensing optical fibres 10 should be arranged so as to be sufficiently exposed to acoustic vibrations generated by vehicles passing along the roadway for those vehicles to be detected as described below. This may be achieved by ensuring that the sensing optical fibres are acoustically coupled to the material of the roadway so that acoustic vibrations generated by vehicles passing along the roadway are transmitted through the roadway into the material of the optical fibres for sensing.

In some embodiments, the one or more sensing optical fibres 10 may be disposed so as to be predominantly exposed to acoustic vibrations arising from either a single carriageway or from multiple carriageways which are carrying traffic in a single direction, so that analysis of acoustic signals arising from traffic along the roadway may be simplified or made more straightforward. In FIG. 1, for example, the sensing optical fibre 10 is disposed along the outside boundary of a two lane, two direction road, proximal to the left side carriageway from the perspective of the viewer, and is therefore predominantly sensitive to acoustic vibration arising from traffic moving along that left side carriageway, and is only marginally sensitive to traffic moving in the other direction along the right side carriageway.

The sensing of acoustic vibration may be achieved in embodiments of the invention using various techniques known in the prior art. Some such techniques are described for example in WO2016/012760, WO2017/125717, WO2019/224511, and WO2012/063066, each of which is hereby incorporated by reference for these and all other purposes, as well as elsewhere in the prior art.

In the particular arrangement of FIG. 1, an interrogator unit 5 of the sensor includes a probe light source 14 for generating probe light pulses 6 of suitable timings, shapes and wavelengths, an optical detector 16 for detecting probe light resulting from the probe light pulses being backscattered within the sensing optical fibre 10, and an analyser 18 for processing data representing properties of the backscattered and detected light which have been received at the optical detector 16. The probe light source 14 forms probe light pulses 6, each pulse having an optical wavelength, and contains one or more laser sources 30 to generate the probe light pulses 6. The probe light pulses may be conditioned in the probe light source by one or more source optical conditioning components 32. The probe light pulses are forwarded to an optical circulator 20 and from there on to the sensing optical fibre 10 which is disposed along the roadway 12 which is to be acoustically monitored for traffic.

Probe light which has been Rayleigh backscattered within the sensing optical fibre is received at the circulator 20 which passes the collected light on to the optical detector 16, which comprises one or more optical detector elements 22. Such detector elements may comprise, for example, one or more suitable photodiodes. The backscattered light may be conditioned in the detector using one or more detector optical conditioning components 24. The detector 16 then passes a detected interference signal B corresponding to the detected backscattered probe light to the analyser 18.

The analyser 18 is arranged to process the detected interference signal B to generate and output a signal A representing acoustic vibration as a function of position and time along the sensing optical fibre 10, and therefore also as a function of position and time along the roadway 12. This signal A is received at a traffic monitor element 30, which is arranged to determine and optionally output various characteristics or properties of the traffic moving along the roadway 12. Such properties may for example include estimated queue parameters Q relating to the presence and properties of one or more queues of traffic 8 along the monitored roadway, in particular one or more queues 8 of slow moving or stationary vehicles, and optionally properties V of individual vehicles such as the position, speed, trajectory, and classification (for example vehicle type or size classifications) of such vehicles. In the examples described below such parameters may include estimated positions of the back and front boundaries of a queue of traffic along the roadway 12, trajectories of these boundaries over time, a measure of speed of traffic within the queue, a measure of the length of time or distance spent by vehicles within the queue, and so forth. Various other properties of the traffic may also be determined from the acoustic signal A may also be output, such as traffic flow rate, current average vehicle speed, and so forth.

Other traffic properties that may be determined from the acoustic data and may be output by the traffic monitor 30, may be properties V of individual vehicles, such as the position, speed, trajectory, classification and/or other properties of each individual vehicle. Such properties V could be determined, or a determination attempted, for all detected vehicles, or only for vehicles at specific locations, times, or satisfying other criteria, such as individual vehicles as they approach a road junction.

Such classifications of individual vehicles could be classifications by approximate vehicle weight or size, and classifications could indicate a best determination of vehicle type such as "car", "van", "light goods vehicle", or "heavy goods vehicle". Such classifications may be made for example by relating magnitude of the vehicles acoustic signal with its speed, and/or by using more sophisticated spectral signature models.

These and other properties of individual vehicles but averaged over time and/or position, for example along a particular road segment and/or period of time, may also be output as average vehicle properties W.

Properties of the traffic which are output by the traffic monitor 30, as well as other data such as the acoustic signal itself, may be passed to one or more internal or external computer systems 26 for storage, display, further analysis, and for other functions such as to trigger an audible or visual alarm 28 dependent on traffic conditions or parameters of detected traffic queues 8. Communication with such computer systems may be over various types of data networks and connections such as wireless telephony, electrical and/or optical network or data connections, and for example may make use of the one or more sensing optical fibres themselves to carry such communications.

The sensor can be used to interrogate multiple sensing optical fibres 10 in parallel or in other configurations, for example with each such sensing optical fibre being disposed along a different carriageway of a road, and/or in two directions around a loop of sensing fibre in order to provide redundancy or for other purposes, using probe light pulses of different wavelengths. Suitable techniques are described in WO2012/076873, which is hereby incorporated by reference for all purposes. Various other arrangements and configurations of the sensor may be employed as will be familiar to the person skilled in the art.

The sensor may be operated using phase-sensitive optical time domain reflectometry (PS-OTDR) in which probe light pulses are used which are each sufficiently coherent that the detected backscatter signal contains or is dominated by self-interference between different parts of the same pulse. Such techniques which may be used in implementations of the present invention are described in WO2006/048647, WO2008/056143 and WO2012/063066 which are hereby incorporated by reference for all purposes. The resulting coherent Rayleigh backscatter leads to a temporal speckle pattern of interference fringes at the detector, which leads to the detector outputting a coherent Rayleigh backscatter interference signal B. This signal from the detector then represents, for each probe light pulse, a time series of intensity of the detected coherent Rayleigh backscatter interference. Typical lengths of the probe light pulses may be about 50 ns, to provide a spatial resolution along the sensing optical fibre of about 5 m, sufficient to detect the progress of separate moving vehicles, although other pulse lengths for example in the range 10 ns-200 ns could be used.

In order to sense changes over time at a particular position along the sensing optical fibre, the temporal development of the interference signal, for a particular round trip time delay for travel of a probe light pulse which corresponds to that position, may be followed over a series of probe light pulses. The round trip time to the end and back to the detector for a 1000 metre long sensing fibre is about 10 microseconds, so that a pulse repeat rate of up to about 100 kHz can easily be used if required, although much lower pulse rates may be used, as long as the resulting detected acoustic signal contains sufficient frequency range to adequately detect the progress of vehicles moving along the roadway.

The form of the coherent Rayleigh backscatter or other interference signal B arising from a single probe light pulse arises partly from refractive index variations along the sensing optical fibre. Such refractive index variations will be partly due to inherent variations arising from manufacture and installation of the fibre. However, the refractive index at any particular location will also vary over time due to environmental effects, in particular local changes in strain imposed on the optical fibre by acoustic vibration coupled into the material of the fibre or into an associated mounting or cable structure. The acoustic signal A can then be derived from the interference signal by direct detection techniques such as comparison of the interference signal at a particular location from frame to frame (for example see U.S. Pat. No. 7,946,341), or by more direct measurement of interference phase change at each location for example by counting fringes. In some implementations, coherent detection techniques may be used, such as those described in Lu et al., *Journal of Lightwave Technology*, Vol. 28, 22, 2010, in which probe light backscattered within the sensing optical fibre 12 is mixed with light from a local oscillator (typically from the same laser source as that used to generate the light directed into the sensing optical fibre), and phase of the mixed light is measured to determine phase changes and therefore acoustic vibration at various locations along the fibre.

Figure 2:
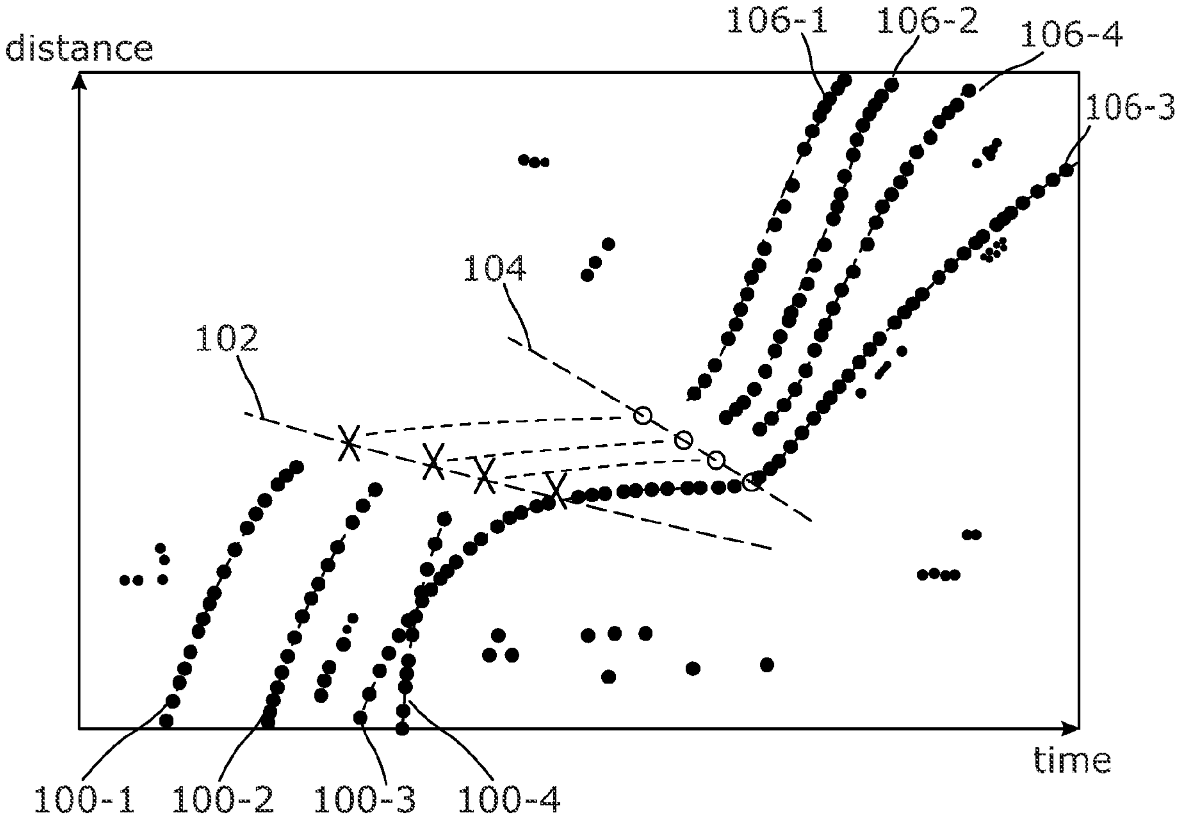
FIG. 2 is a time—distance plot along a roadway of detected acoustic vibration arising from a number of vehicles approaching, entering, then departing from a queue of traffic.

FIG. 2 provides a sketch of a section of acoustic signal A over a limited time and spatial range along a roadway. In particular, the illustrated section illustrates traffic arriving at the back of a queue and departing from the front of the same queue. The axes of the graph are time along the abscissa, distance along the ordinate, and an intensity of the acoustic signal at a particular time and position is shown by the strength of the shading at that point. The intensity of the acoustic signal may be an overall intensity or measure of power over the full range of detected acoustic frequencies, or may result from processing in some way, for example with different frequency bands being weighted differently so as to contribute to the overall intensity to different degrees. In this way, the intensity of the acoustic signal can be calculated so as to maximise the visibility and usefulness of acoustic signals arriving from vehicles and to minimise spurious noise which may tend to confuse such vehicle signals.

A number of vehicle tracks, each corresponding to a particular vehicle progressing along the roadway, can be seen, with steeper tracks corresponding to faster vehicle speeds. For clarity, a rather limited number of vehicle tracks are shown, and many more may be apparent in practice, for example in situations of heavy and continuous traffic.

A series of vehicle tracks 100 to the lower left represent vehicles moving towards the back 102 of a queue of traffic, the estimated position of which is indicated by a broken diagonal line. Once beyond the back of the traffic queue, that is inside the queue, vehicles may be stationary or slow moving, or may oscillate between these states. While slow moving, the speeds of vehicles may be variable. The approximate presumed tracks of the vehicles within the queue are shown with broken lines.

As the vehicles move closer to the back of the queue their speeds reduce, and the gradient of the tracks in the graph therefore also reduce. At some point before stopping at the back of the queue 102 or slowing to a speed at which the queue is said to begin, the acoustic signal generated by most of the vehicles disappears, giving rise to a termination of the tracks 100-1, 100-2 and 100-4. This is because, as the corresponding vehicle slows, the acoustic signal it generates reduces in intensity and becomes undetectable. The track 100-3, caused in this case by a slower moving and noisier vehicle, persists all the way to the back of the queue 102 and within the queue as well.

Whether the track from a particular vehicle terminates and become undetectable before arriving at the estimated position of the back of the queue 102 is reached will depend on a variety of factors such as the nature of the road surface, the amount of engine noise generated by the vehicle, the weight and size of the vehicle, and the speed of movement within the queue.

Although the back of the queue 102 may be defined or estimated in various ways as discussed further below, in FIG. 2 the point at which each vehicle is deemed to reach the back of the queue is marked by a corresponding X symbol. It can be seen that the back of the queue 102 in FIG. 2 then follows a trajectory which moves backwards along the roadway, albeit at a slow speed as indicated by the shallow gradient of the broken line.

Once inside the traffic queue, many of the vehicles may be moving too slowly to generate a visible track in FIG. 2, and may be essentially undetectable within the acoustic signal, or at best marginally detectable above other acoustic sources such as vibrations from other nearby roadways and more general noise. However, at some point each vehicle within the queue will start to move or move more quickly when it is at the front boundary of the queue 104, an estimated position of which is also indicated in the figure by a broken line. For some of the vehicles of FIG. 2, no new track 106 becomes visible until some time after leaving the front of the queue when the vehicle reaches a sufficient speed to give rise to a visible track, but the point at which each vehicle is deemed to depart from the front of the queue is marked by a corresponding O symbol. The track for each vehicle then increases in gradient in the graph as the vehicle speeds up.

It can be seen that the front of the queue in FIG. 2 then follows a trajectory which moves backwards along the roadway.

Although supposed but undetectable tracks of vehicles within the traffic queue are illustrated as broken lines in FIG. 2, it may not always be possible to determine which track 106 of a vehicle leaving a queue corresponds to which track 100 of a vehicle entering the queue. A matching of the pre-queue and post-queue tracks 100, 106 may be achieved by assuming a fixed order of vehicles within the queue, and keeping track of vehicles entering and leaving, although this may not always be completely reliable, and some indication of how pre-queue and post-queue tracks can be matched may be achieved by making assumptions about the maximum expected speed of vehicles in the queue, for example from measurements of the degree to which acoustic signatures from vehicles in the queue can be seen.

In the example of FIG. 2, it can also be seen that the length of the queue is diminishing over time, as vehicles leave the front of the queue more quickly than they arrive at the back of the queue. Such a queue dynamic may be typical of queue behaviour on a freeway or motorway in heavy traffic, in which queues spontaneously form, lengthen, then perhaps shrink and disappear, or perhaps stay of substantially the same length but retreat backwards along the roadway. However, many other different causes and dynamics of traffic queues may be seen in the sensed acoustic data, for example traffic queues forming at junctions or traffic lights, traffic queues forming along up-ramps onto and down-ramps off freeways of motorways, and traffic queues forming in response to broken down or stranded vehicles. Each such type of queue may exhibit different dynamics in terms of positions or trajectories of the back and front boundaries of the queue and other characteristics which can be determined from the acoustic signal.

Although in FIG. 2 the tracks of individual vehicles can be easily seen and separated using suitable track following algorithms, this may not always be the case. Whether the tracks are easily separated in this way or not, in some embodiments it may be preferable to determine composite movement data for vehicles moving along the roadway as discussed in more detail below, and use the composite movement data to estimate positions of a boundary of a queue. For example, the acoustic signal may be filtered or otherwise processed in various ways to provide composite movement data which indicates traffic speed as a function of time and of position along the roadway. Although this composite movement data may no longer be sufficient to derive each separate vehicle track, it can still be used to estimate the back and front boundaries of a queue of traffic, for example by interpolating the composite traffic movement to a boundary trajectory where the average traffic speed falls below a particular speed or meets some other criteria.

Figure 3:
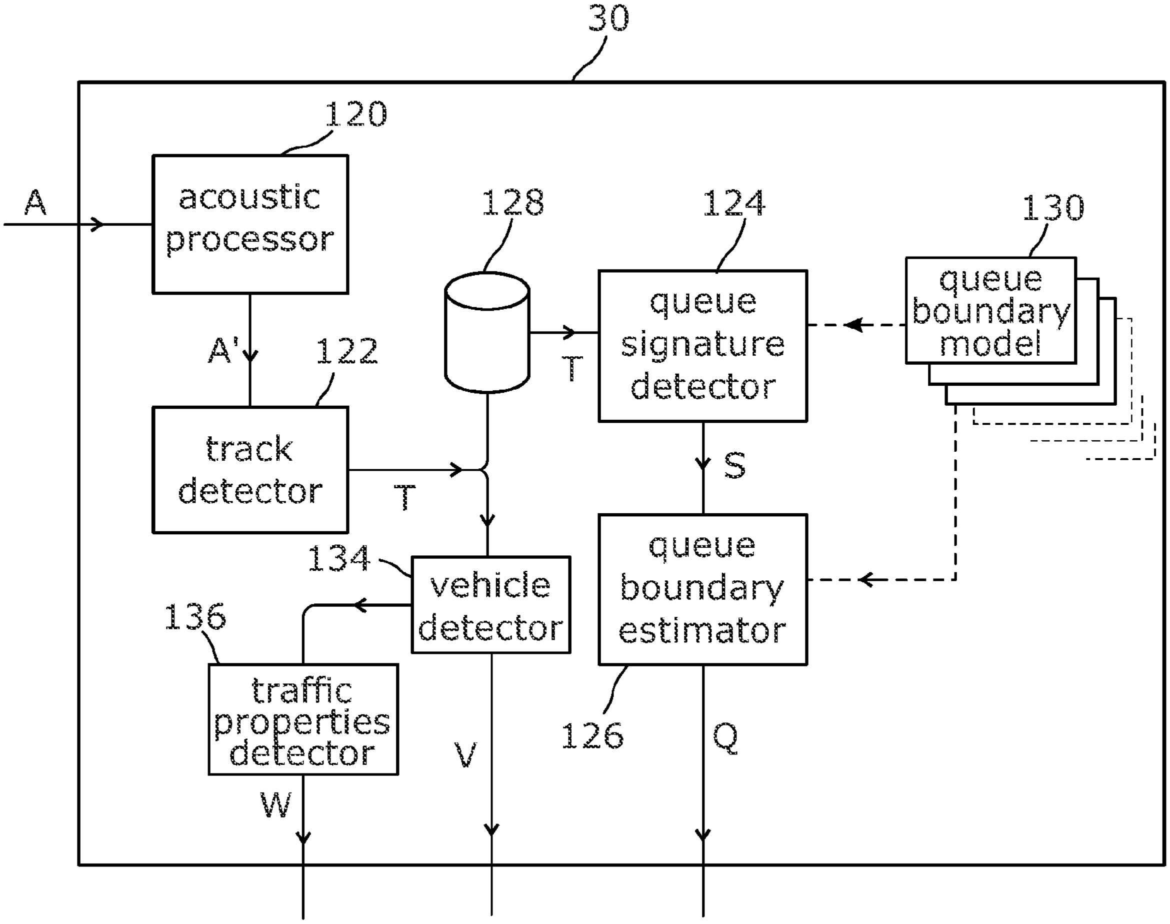
FIG. 3 shows an implementation of the traffic monitor element of FIG. 1, arranged to detect boundaries of traffic queues from vehicle tracks in detected acoustic vibration.

FIG. 3 illustrates how functional aspects of the traffic monitor element 30 of FIG. 1 may be deployed and arranged in order to estimate a position or trajectory of the back and/or front boundaries of a traffic queue 8, or more generally any number of such boundaries or features which may become apparent within acoustic data A for a length of roadway 12.

The traffic monitor 30 receives from the analyser 18 an acoustic signal A which is provided as a function of both time and distance along the roadway. The received acoustic signal A may typically be provided as an acoustic amplitude signal over time determined for each of a large number of spatial locations along the sensing optical fibre 10, for example at spatial locations around 5 metres apart. Such an acoustic amplitude signal may for example represent acoustic sampling at a data rate of about 20 kHz, in order to represent acoustic vibration at frequencies of up to about 10 kHz, although other sampling rates may of course be used subject to providing an acoustic frequency range adequate for the purposes described below.

An acoustic processor 120 then receives the acoustic signal A and carries out any required filtering, spectral analysis, spatial and temporal binning, and/or other processes which might be needed for further analysis of the signal, and in particular to assist in the detection of vehicle tracks as discussed below. The result of this processing is then output as a processed acoustic signal A'. For example, a spectral analysis of the acoustic signal could be carried out to form a time dependent acoustic spectrum, and those parts of the acoustic spectrum most suitable for detecting vehicle tracks could be combined into a single intensity value as a function of time and position along the roadway, with a suitable time resolution for detecting tracks such as around 0.1 seconds.

The processed acoustic signal A' is then passed to a track detector 122 which is used to detect tracks of individual vehicles within the acoustic signal A'. Subject to the tracks being sufficiently clear in the processed acoustic signal A' this process is reasonably straightforward, for example since the tracks represent vehicle positions only along a one dimensional line of the roadway, but of course visibility (in the processed acoustic signal) of the acoustic signal from a particular vehicle may vary significantly over time for various reasons such as the degree of road noise, levels of other spurious or interfering noise, speed of the vehicle, and so forth. For such reasons, Kalman filters or similar techniques which are well known in the art may be used to permit a track to be followed, taking benefit from using principles of conservation of momentum and limits on acceleration, or other expected track behaviour, to make this process more effective and reliable. See for example Anton Haug, "*Bayesian Estimation and Tracking, A Practical Guide*", Wiley, 2012.

The output from the track detector 122 is then data defining or describing a plurality of vehicle tracks T, which may typically be defined by vehicle position along the track as a function of time, and optionally also other parameters such as velocity and acceleration, each as a function of time, since these variables may be more accurately and reliably provided from a Kalman or other filter used to derive the track than can be back calculated from a best estimate of position. Each track may also provide an estimate of certainty for the provided track variables, typically also as a function of time, as well as parameters such as an acoustic signature or classification of the vehicle (for example indicating whether the vehicle is a heavier or lighter vehicle).

The plurality of vehicle tracks T is passed to a queue signature detector 124 which is arranged to detect in the vehicle tracks T one or more queue signatures S. Each queue signature may for example be a signature of the back of a traffic queue, in which a plurality of vehicles are seen to slow down as they approach the back boundary of a queue, or a signature of the front of a traffic queue, in which a plurality of vehicles are seen to speed up as they advance from the front boundary of a queue. Typically, both the back boundary and the front boundary of the same queue may be detected in this way, although this may not always be the case, since it is possible that only one such boundary is within the scope of the sensing optical fibre along the roadway, or the back boundary may no longer be visible when vehicles start to leave the front of the queue.

The one or more queue signatures S may be detected by determining that particular groups of tracks, or rather particular portions of such tracks, satisfy one or more queue boundary models 130 which define constraints which must be met by a group of track segments in order to satisfy the model. To this end, each detected signature S may be defined by a group of track segments, each such segment corresponding to a different vehicle as it approaches the back or departs from the front of a particular traffic queue. Some different ways in which such queue boundary models 130 may be defined are discussed in more detail below.

The detected queue signatures S are then passed to a queue boundary estimator 126 which estimates one or more parameters Q of a detected queue from the queue signatures. Such parameters may in particular include the position of the back or the front boundary of a traffic queue, and therefore also optionally development of such a boundary over time in the form of a queue boundary trajectory. If both the back and front of the same queue are detected, parameters such as queue length as a function of time, projected time to a queue disappearing, and other measures can be provided. Other parameters may include an estimate of speed of traffic within the queue, and a measure of the length of time or distance spent by vehicles within the queue.

As shown in FIG. 3, the queue boundary estimator 126 may also use the queue boundary models 130 for the purposes of estimating the one or more parameters Q from the queue signatures S. To this end, although shown as separate processes for clarity in FIG. 3, the process of queue signature detection and queue boundary estimation may be combined together such that queue signature detection becomes a part of the process of identifying queue boundary parameters from the vehicle tracks T using the queue boundary models 130, for example without any overt queue signature data S being generated.

Because vehicle tracks may terminate or become undetectable before the associated vehicles reach the approached boundary of the queue, or start or become detectable only after the associated vehicles have advanced from the departed boundary of the queue (see FIG. 2 and discussion above), the queue boundary estimator 126 may be arranged to extrapolate vehicle tracks of a detected queue signature either forwards to the approached back boundary of the queue, or backwards to the departed front boundary of the queue. In this way, a position of a queue boundary can be estimated even though not directly visible in the track data. This extrapolation of the track forming part of a detected queue signature may for example be carried out in accordance with one or more of the queue boundary models 130, for example using a dynamic model of expected vehicle speed change, or by some more linear interpolation to a presumed or estimated queue traffic speed.

Since the sensor will typically be deployed to sense acoustic vibration along the roadway 12 in real time, and it will typically be desirable to detect queue signatures and detect traffic queues as they develop and change, the traffic monitor 30 will typically be arranged to make estimates of queue boundaries and other parameters Q which represent current road conditions, as well as estimating the trajectories of such queue boundaries and other parameters over time. However, since queue boundaries are typically determined from the behaviour of a plurality of vehicles approaching or departing from a queue, the queue signatures need to capture a plurality of vehicle tracks over a period of time, say of at least some ten seconds or tens of seconds. To this end, the flow of acoustic data A and processed acoustic data A' will give rise to vehicle tracks Twhich include both current positions and other parameters, and such positions and other parameters in the recent past, for example at least over a historic interval of around a few minutes, and longer if desired. It may therefore be important for the queue signature detector to have access, for example using the illustrated track data store 128, to vehicle track data which is persistent for at least some minutes.

The parameters Q of detected queues can be output from the queue monitor 130 and passed to one or more other elements or systems, such as internal or external further computer systems 26 as depicted in FIG. 1. Such systems may be used for example for display to a user of the system traffic status such as indications of currently developing, dissipating, and persistent traffic queues, and to raise alarms to such a user depending on such information.

The parameters Q of detected queues may also be used, as discussed further below, to provide data to traffic control or signage systems, for example to provide traffic information, warning, and/or control signals visible to vehicles which are dynamically dependent on the detected queue parameters. Similarly, the parameters Q of detected queues may also be passed to vehicles currently on the roadway, or which will in the near future be present on the roadway, for example to autonomously or partly autonomously operating vehicles in order to improve traffic flow through operation of those vehicles in response to those parameters.

The traffic monitor 30 of FIG. 3 also comprises a vehicle detector element 134 which may operate by receiving track data T (either from the track detector 122 or from the data store 128), and determining from the track data properties of one or more individual vehicles as already discussed above in respect of FIG. 2, for example the speed or trajectory of a vehicle approaching a junction. Similarly, the traffic monitor 30 of FIG. 3 also comprises a traffic properties detector 136 which determines one or more average properties of vehicles Was already discussed above in respect of FIG. 2, such as average speed of vehicles within a particular road segment for rolling or successive time windows.

The traffic properties detector 136 may operate by receiving and averaging properties V of individual vehicles received from the vehicle detector 134, or more directly using the track data T However, in some embodiments the individual vehicle properties V and/or average vehicle properties W may be determined more directly from the acoustic data A' instead of from track data received from the track detector 122.

Figure 4:
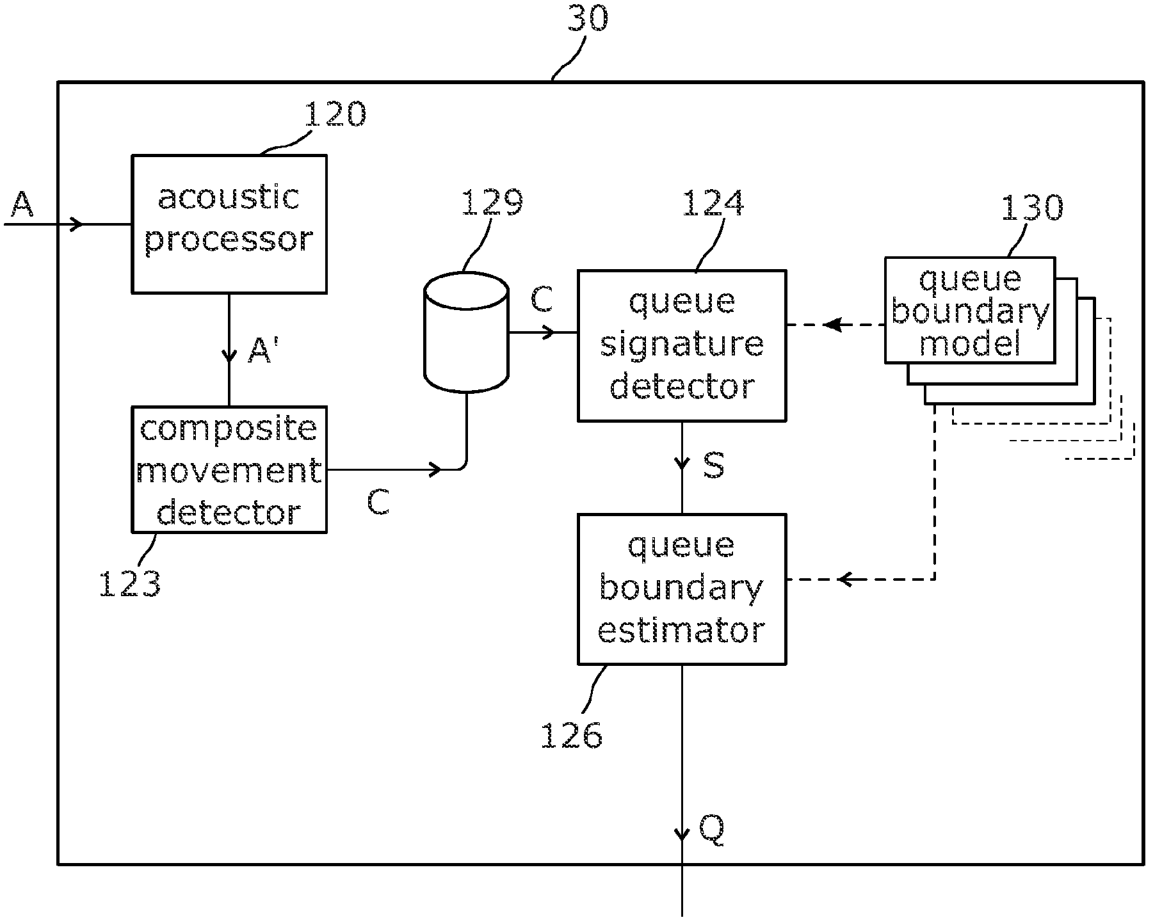
FIG. 4 shows an alternative implementation of the traffic monitor element, arranged to detect boundaries of traffic queues from traffic composite movement data derived from detected acoustic vibration.

It was mentioned above that, rather than detecting queue signatures and properties of those queues from individual vehicle tracks T, they may be detected from composite movement data which describes the flow of traffic along the roadway without necessarily identifying individual vehicles within that data. An implementation of the traffic monitor 30 of FIG. 1 operating long these lines is illustrated in FIG. 4.

As for the arrangement of FIG. 3, acoustic data A arrives at the traffic monitor 30 from the analyser 18 of FIG. 1 and is conditioned or processed using acoustic processor 120 to form processed acoustic data A'. However, rather than the processed acoustic data then being used to detect tracks of particular vehicles along the roadway, a composite movement detector 123 is used to generate composite movement data representing the traffic. Such composite movement data C may for example comprise traffic speed and vehicle count, rate of flow, or density estimates as a function of time and of position along the roadway, from which the tracks (such as speeds and positions) of individual vehicles are not discernible.

Figure 5A:
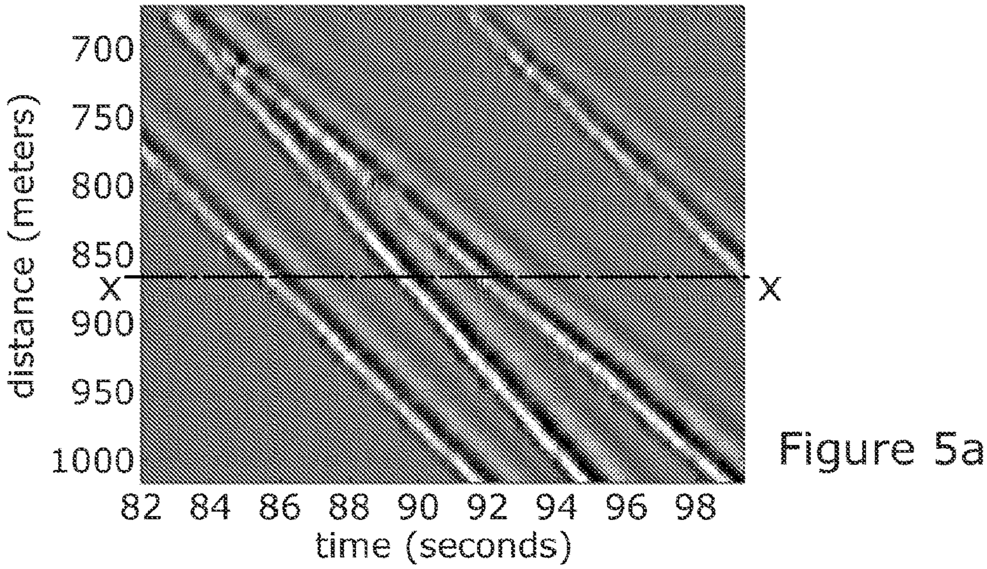
Figure 5B:
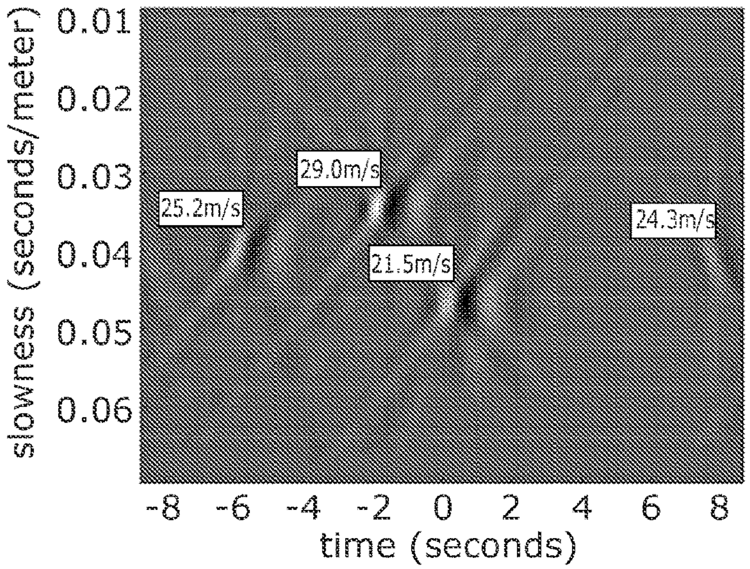
Figure 5C:
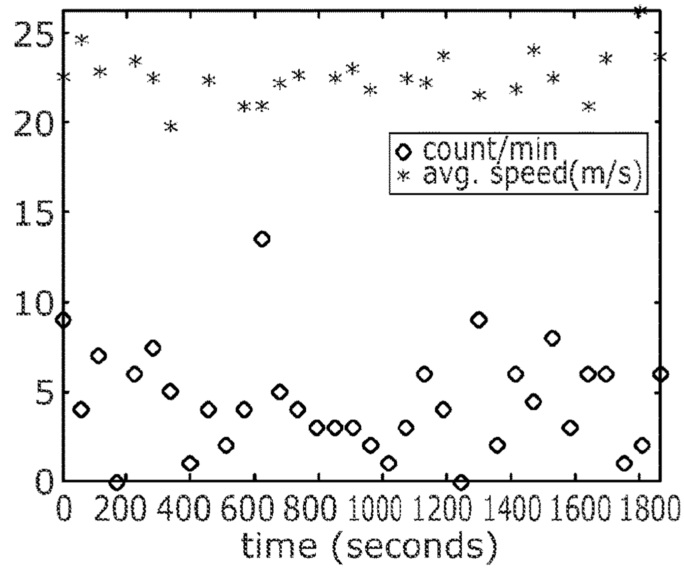

Such composite movement data may be obtained in a variety of ways, for example by applying one or more filters to the processed acoustic data A' so as to generate the composite movement data without following or generating individual vehicle tracks. One particular example of this is to apply a Radon transform to the processed acoustic data A'. This process is illustrated in FIGS. 5*a*-5*c*. FIG. 5*a* illustrates processed acoustic data A' in which tracks of four vehicles can be seen travelling at speeds of around 20 m/s. A Radon transform of this data proximal to a particular position along the roadway indicated by broken line X—X in FIG. 5*a* is taken, and the results of this transform are shown in FIG. 5*b*, which plots results of the transform (shown as colour intensity) as a function of time (abscissa) and speed, or in this case "slowness" in seconds/metre (ordinate). Suitable Radon transforms for this purpose are described for example in Yangkang Chen, "Automatic velocity analysis using high-resolution hyperbolic Radon transform", *Geophysics* (2018) 83 (4), A53-A57, July 2018, which document is here by incorporated by reference for these and all other purposes.

These results of the Radon transform can then be used to derive composite movement data such as that shown in FIG. 5*c*, where asterisk points are used to show average speed of all traffic passing a particular roadway position within intervals of around 1 minute, and diamond points to indicate the number of vehicles passing the position within the same intervals. For example, such composite movement data can be derived by applying time windows to the data of FIG. 5*b* over extended periods, and averaging the speed values of the intensity peak features seen in FIG. 5*b* over those time windows. In practice, it may be desirable to obtain composite movement data with a finer spatial resolution, say of 20 seconds, but the useful resolution for any particular period of time may depend on the amount of traffic passing a particular point.

Returning to FIG. 4, and similar to the arrangement of FIG. 3, the composite movement data C is then passed to a queue signature detector 124, which has access to historical composite movement data C persistent typically for at least several minutes, for example using a composite movement data store 129. Similar to FIG. 3, the queue signature detector 124 looks for patterns within the composite movement data which satisfy one or more queue boundary models 130, these patterns or portions of the composite movement data then being determined as signatures S of the back or front of a traffic queue. These queue signatures are then used by queue boundary estimator 126 to estimate one or more parameters Q of a detected queue from the queue signatures.

Such parameters may in particular include the position of the back or the front boundary of a traffic queue, and therefore also optionally development of such a boundary over time in the form of a queue boundary trajectory. If both the back and front of the same queue are detected, parameters such as queue length optionally as a function of time, projected time to a queue disappearing when the front and back boundaries are projected to meet, and other measures can be provided. Other parameters may include an estimate of speed of traffic within the queue, and a measure of the length of time or distance spent by vehicles within the queue.

Also as for FIG. 3, the queue boundary estimator 126 may also use the queue boundary models 130 for the purposes of estimating the one or more parameters Q from the queue signatures S. To this end, although shown as separate processes for clarity in FIG. 4, the process of queue signature detection and queue boundary estimation may be combined together such that queue signature detection becomes a part of the process of identifying queue boundary parameters from the composite vehicle data C using the queue boundary models 130, for example without any overt queue signature data S being generated.

Although not shown in FIG. 4, the traffic monitor of FIG. 4 may also comprise a vehicle detector 134 and/or traffic properties detector 136 as shown in FIG. 3. In this situation, the vehicle detector 134 may need to make use of the processed acoustic data A' directly, if no separate track detector is provided, or could include a track detector function within the traffic properties detector itself. The traffic properties detector may make use of composite movement data C directly, and/or receive individual vehicle properties from the vehicle detector 134.

Figure 6A:
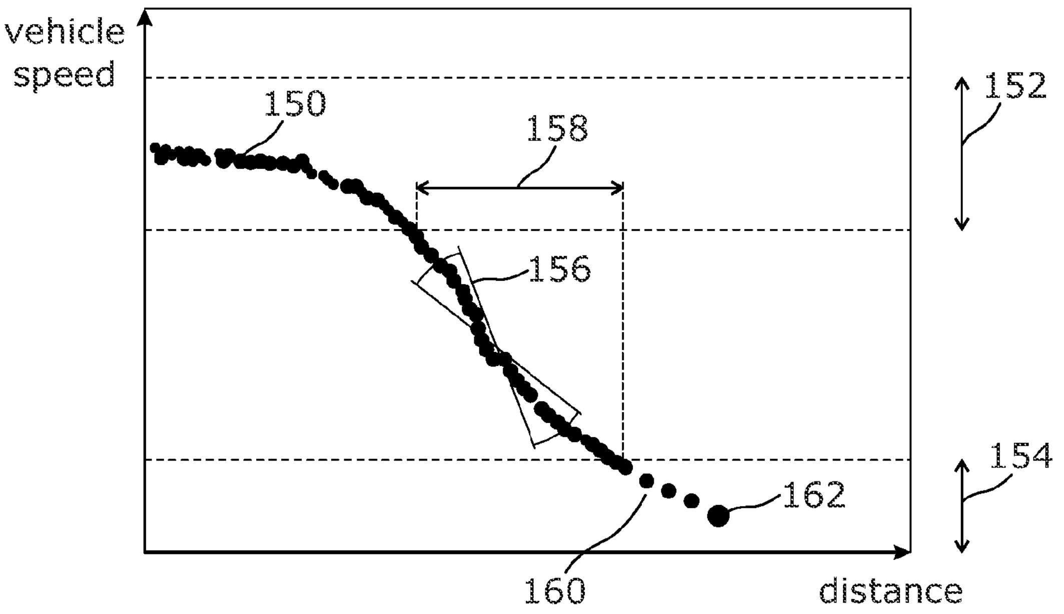
Figure 6B:
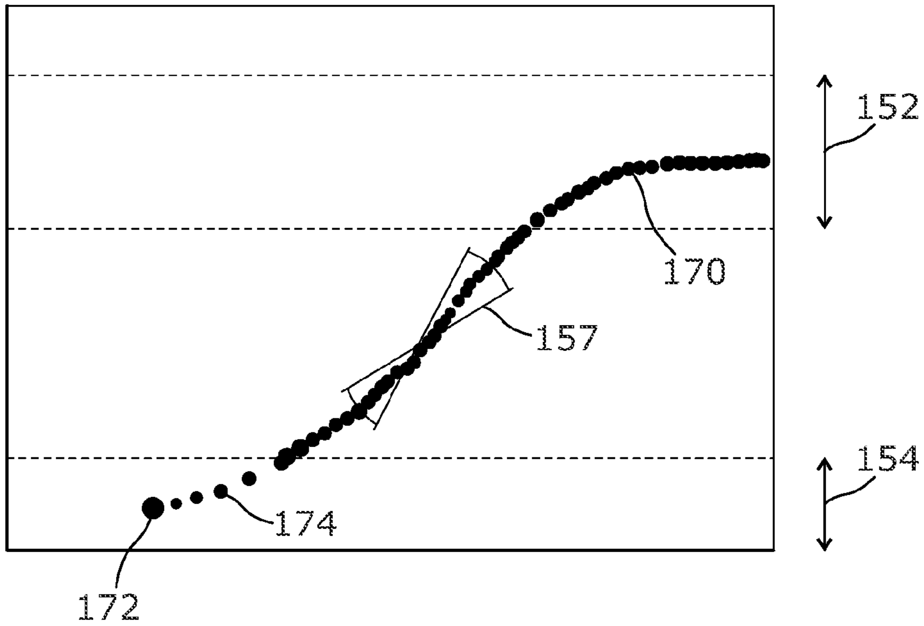

A number of ways in which the one or more queue boundary models 130 may be configured to support detection of queue signatures by the queue signature detector 124 and estimation of queue boundaries and other queue parameters by the queue boundary estimator 126 will now be described. Referring first to FIGS. 6*a* and 6*b*, a queue boundary model may define one or more patterns of speed change, and/or similarity between tracks, of vehicles approaching, and/or advancing from, the boundary of the queue to be detected, which are required to be present in vehicle tracks or composite movement data, for a queue signature to be detected.

FIG. 6*a* is a plot of vehicle speed against distance along the roadway, and a single track 150 of a particular vehicle is shown although multiple similar tracks will typically be present in advance of a back of queue boundary. Such a track may form part of the track data T supplied to the queue signature detector 124 in FIG. 3. A currently defined range of free flowing traffic speed along the roadway is shown as range 152, which may be a fixed range, or could be determined dynamically by the model or some other internal or external function, for example as a function of date and/or time, from current or recent observations, or in other ways. A further current range of queue traffic speed along the roadway is shown as range 154, which again may be a fixed range, or could be determined dynamically for example as a function of date and/or time, from current or recent observations, or in other ways.

A queue boundary model 130 may apply a combination of conditions to tracks, or portions of tracks, such as the track shown in FIG. 6*a*, which must be satisfied in order that the tracks are deemed to satisfy the queue boundary model and therefore to constitute a queue signature, in this case the signature of the back of a traffic queue. Some such conditions or combinations of conditions may be defined as patterns of speed change of vehicles, and/or similarity between tracks of vehicles, as they approach, and/or advance from the boundary of a supposed queue.

One such condition could be that a particular number of vehicles transition from the free flowing traffic speed range 152 to the queue speed range 154 within a particular length of time, for example at least four vehicles within one minute, or within a particular range of position. Another condition could be that the rate of deceleration of such vehicles falls within a particular range, as illustrated by the deceleration range 156 (seen as a range of gradients in this speed-distance graph), and/or that the tracks fit a particular range of shapes of speed change curve.

A position range of the track 150 in FIG. 6*a* which falls between the range of free flowing traffic speed and the range of queue traffic speed is shown as range 158, and may be termed a queue approach zone 158, although such a queue approach zone 158 could be defined in various other ways.

Since a queue is likely to be defined by speed changes of vehicles which are consistent with each other in terms of position of the queue approach zone, another condition of the queue boundary model for detecting a queue signature could be that a number of vehicle tracks within the supposed queue signature should exhibit queue approach zones 158 which progress sequentially in distance, either forwards or backwards along the roadway, or indeed do not progress significantly, with a given degree of consistency.

Another function of a queue boundary model 130 discussed above is to provide an estimate of a queue boundary position from the track data T Since the exact speed of traffic once in the queue is not necessarily well known (traffic could be stationary or slow moving for example), and any particular track may disappear or become indeterminate as the vehicle slows and becomes difficult to identify in the acoustic data A', the queue boundary model may be arranged to provide an extrapolation of one or more tracks to an estimated boundary position. In FIG. 6*a* this is extrapolation is shown by broken line 160, and the estimated position of the back boundary of the queue, by point 162. This extrapolation may for example be achieved by fitting a queue boundary function to the form of the track as it approaches the boundary, the queue boundary function being determined for example empirically from detailed observations of traffic queues, by theory or in some other way, or by a more simple linear extrapolation from the visible end of the track to a supposed traffic speed of zero at the queue boundary. Such a queue boundary function may be provided as part of a suitable queue boundary model, for example a queue boundary function for a back of queue boundary model may be comprised in a queue boundary model configured to detect a queue signature for a back of queue boundary.

FIG. 6*b* is similar to FIG. 6*a* but shows how a queue boundary model 130 may be arranged to detect a signature of a queue boundary at the front of a queue, using similar or corresponding conditions to those described in respect of FIG. 6*a*, by detecting one or more patterns of speed change of vehicles advancing from the front of the queue and/or one or more patterns of similarity between such tracks.

In FIG. 6*b* a single track 170 is shown in which a vehicle advances from the estimated front boundary point 172 of a queue (which is estimated by backwards extrapolation of the track along broken line 174), before speeding up to rise above a queue speed range 154, and after some time enter a free flowing traffic speed range 152. Conditions which may be required by a queue boundary model for detection of a front boundary of the queue may for example include that a particular number of vehicles transition from the queue speed range 154 to the free flowing traffic speed range 152 within a particular length of time, for example at least four vehicles within one minute, or within a particular range of position. Another condition could be that the rate of acceleration of such vehicles falls within a particular range, as illustrated by the acceleration range 157 (seen as a range of gradients in this speed-distance graph), and/or that the tracks fit a particular range of shapes of speed change curve.

Figure 7A:
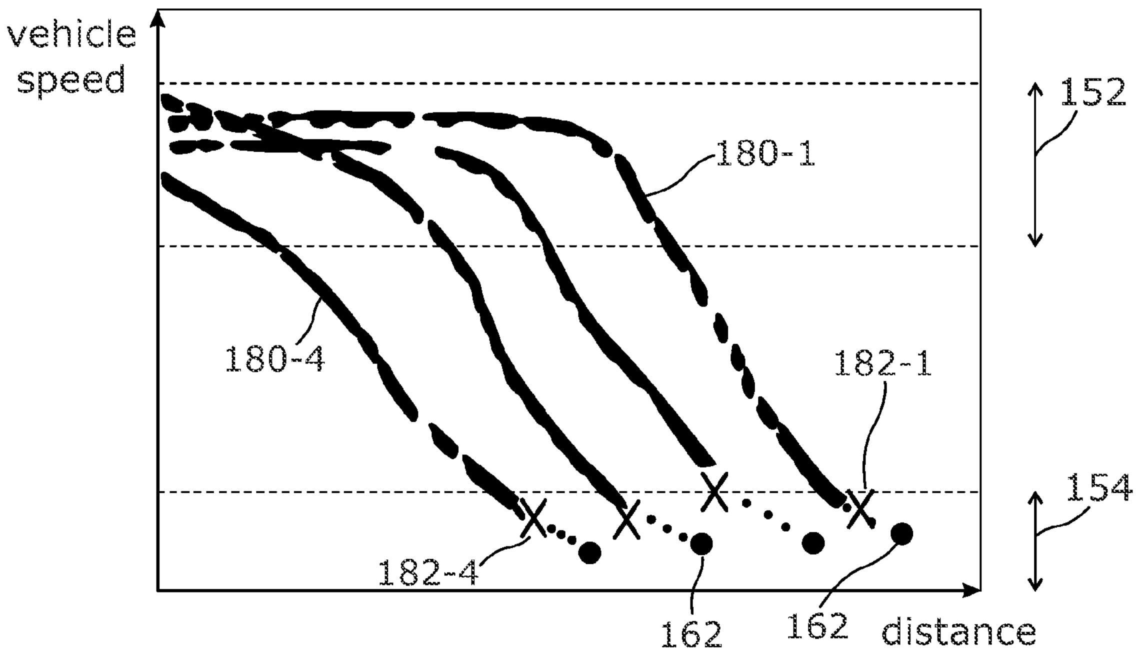
Figure 7B:
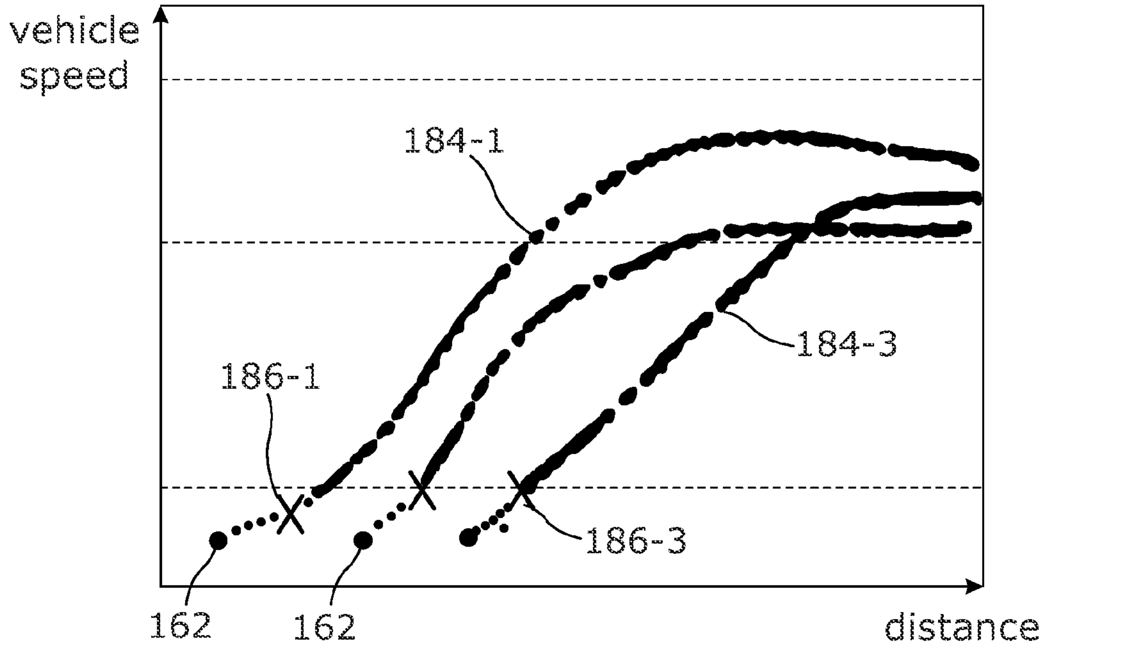

Referring next to FIGS. 7*a* and 7*b*, a queue boundary model may define one or more patterns of tracks terminating, and/or similarity between tracks, as vehicles are approaching, and/or advancing from, a boundary of the queue, which are required to be present in vehicle tracks or composite movement data, for a queue signature to be detected.

FIG. 7*a* is a plot of vehicle speed against distance along the roadway, and a plurality of tracks 180-1 . . . 180-*n* corresponding to a plurality of vehicles can be seen, as each vehicle in sequence slows down in approaching the back of the queue. Although a free flowing traffic speed range 152 and a queue traffic speed range 154 are depicted, FIG. 7*a* more particularly shows that each of the plurality of tracks 180-1 . . . 180-*n* ends in a corresponding track termination point 182-1 . . . 182-*n*, marked by a X, where the track of the vehicle becomes undetectable through the vehicles slowing to speeds (which may not be the same speed for all vehicles, of course) where insufficient vibrations are generated for reliable detection. A track termination point may in some cases correspond to a vehicle stopping altogether in the queue, and in some cases a track may not terminate in a queue because for example the vehicle is still noisy when stationary or slow moving, or the queue is moving sufficiently quickly for the vehicle track to still be detectable.

A queue boundary model 130 may then include one or more conditions relating to patterns of such track termination points for a queue signature to be detected, for example requiring there to be a sequence of at least four or some other number of track termination points within a particular range of position and/or time along the roadway, that such track termination points should be spaced by distances or time intervals falling within certain ranges and so forth.

In FIG. 7*b* corresponding track termination points 186-1 . . . 186-*n* which are the starting points for new vehicle tracks for a front boundary of a queue are also marked by an X, with the corresponding vehicle tracks then developing as 184-1 . . . 184-*n*, and as for FIG. 7*a* a condition of the queue boundary model 130 may for example require there to be a sequence of at least four or some other number of track termination points within a particular range of position and/or time along the roadway, that such track termination points should be spaced by distances or time intervals falling within certain ranges and so forth.

A queue boundary model 130 may also include one or more conditions relating to a pattern of similarity between tracks of vehicles approaching, and/or advancing from, the boundary of the queue, for a queue signature to be detected. For example, such a condition may require at least a minimum number of non-overlapping consecutive tracks within a particular time period or distance to display patterns of speed change which are sufficiently similar in terms of range of deceleration or acceleration, or other properties, as can be seen in FIGS. 7*a* and 7*b*.

Estimated parameters of traffic queues which are automatically detected, for example as described above, and indeed more generally acoustic vibration detected using a sensing optical fibre disposed along a roadway, can be used in various ways such as within the automatic control of traffic signals and traffic lights, of warning signs, and in other ways.

For example, FIG. 8 illustrates a traffic queue 8 which has formed along a roadway 12 due to the presence and operation of one or more road traffic signals 200, for example traffic lights, typically installed at a road junction or intersection 202. A sensor as already described above comprises an interrogator unit 5 coupled to a sensing optical fibre 10 which extends along the roadway 12 in order to detect acoustic vibration generated by traffic on the roadway.

Also illustrated is a road traffic signal controller 210, which is arranged to receive data relating to detected road traffic from the interrogator 5, and in particular a traffic monitor element 30 of such an interrogator. Note that although the road traffic signal controller 210 is illustrated as a discrete element proximal to the interrogator, and indeed these may be elements which are collocated at a convenient roadside position, more generally some or all aspects of the road traffic signal control 210, and also of the traffic monitor element 30, may be located elsewhere, close together or far apart, distributed across multiple locations or implemented at least partly in cloud services, and so forth. The road traffic signal controller 210 is then arranged to use data received from the interrogator in controlling the one or more traffic signals. In the situation shown in figure for example, the traffic monitor may detect position of a back boundary of the queue 8, and adjust the timing of signals presented by the road traffic signals accordingly, for example permitting more vehicles to pass one or more of the signals if the back boundary is more distant, and permitting fewer vehicles to pass if the back boundary is closer to the one or more traffic signals. Control of the road traffic signals may similarly be responsive to parameters determined by the traffic monitor 30 such as queue length, an estimated or average time or distance spent by vehicles in the queue 8, and various such parameters detected for traffic and traffic queues along other roadway segments affected by the one or more road traffic signals.

In this way, the road traffic signals may be controlled, for example, to permit an increased number of vehicles to pass the road traffic signals in response to an increased length of the queue of traffic, or a decreased number in response to a decreased length of the queue.

Of course, much more complex systems than that depicted in FIG. 8 may be implemented, in which multiple runs of sensing optical fibre (which may be part of one or multiple actual sensing fibres) along multiple segments of roadway in simple or more complex roadway arrangements, junctions, multiple lanes, and so forth, may be used for acoustic detection of vibration caused by traffic, and control of road traffic signals in response to such detected vibration and traffic.

In addition to or instead of improving traffic flow at a road junction, embodiments of the invention may be used to mitigate potentially dangerous situations. FIG. 9 depicts a particular such situation which may be addressed using an arrangement similar to that of FIG. 8, but which does not necessarily require queue detection. Instead, in FIG. 9, properties V of an individual vehicle 250 that is approaching a road junction or intersection 252 along a first roadway 254 are determined by the traffic monitor 30 of interrogator 5 from acoustic vibration detected using the sensing optical fibre 10 that extends along the first roadway 254 (see for example FIG. 3 and the related discussion of individual vehicle properties above). Of course the same sensing optical fibre 10, or other sensing optical fibres may similarly be used to detect acoustic vibration along other roadways joining the road junction, and indeed within the road junction itself.

The road junction 252 may also be approached, by other vehicles 256, at least along a second roadway 258, and typically along further roadways as well. Entry of approaching vehicles into or onto the road junction 252 is at least partly controlled by a plurality of traffic signals 260, which are themselves controlled by a road traffic signal controller 210.

The properties V of the vehicle 250 approaching the road junction may in particular comprise a trajectory of the vehicle, including for example, one or more of speed, position and acceleration. If it appears that the vehicle 250 may enter the junction dangerously, for example in contravention of the traffic signals 260 or otherwise during a period when other vehicles may enter from other directions in a conflicting fashion, then the traffic monitor 30 may send a hazard indicator H to the road traffic signal controller 210 which then controls the road traffic signals to reduce or eliminate the danger or conflict, for example by delaying signals permitting other vehicles 256 to enter the junction.

For example, the dangerous situation may be detected using a danger condition or danger condition model 262 comprised in the traffic monitor 30, and the hazard indicator H may then be sent to the road traffic signal controller if the danger condition of the model 262 is met.

By way of example, the danger condition may be met if vehicle 250 is approaching the junction within a range of trajectories which make it likely or expected that the vehicle 250 will enter the junction in contravention of a traffic signal 260 or nearly so, for example by passing a "red light" or stop sign, or more particularly passing a "stop line" 270 on the roadway corresponding to such a stop sign. To this end, the traffic monitor 30 may receive traffic signal data S from the road traffic signal controller 210 relating to factors such as the state and timing of the road traffic signals 260, in order to be able to test if the danger condition is met.

A typical danger condition model 262 could specify that the danger condition is met if the vehicle 250 is projected or expected to pass a stop sign or red light or corresponding stop line 270. More particular examples could be that the danger condition is met if the vehicle 250 is travelling towards the junction 252 along roadway 254 at least at a particular speed, within a particular distance of the road junction 252 or stop line 270, and is not slowing down, or is slowing down but with a deceleration of less than a particular amount, at the time when a traffic signal for controlling entry to the junction along that roadway changes from "green" to "amber", where "amber" indicates that the signal is about to transition to "red" or "stop". Another typical danger condition could specify that it is met if vehicle 250 is within a particular distance from the junction or stop line and increases in speed towards the junction for at least 0.5 seconds following a change in the relevant traffic signal from "green" to "amber".

The traffic signal controller 210 is then preferably arranged such that if the danger condition of the model 262 is met, for example as indicated by receipt of the hazard indicator H, suitable corrective or controlling action is carried out. In particular, the traffic signal controller 210 may control one or more of the road traffic signals so as to delay entry of one or more other vehicles such as vehicle 256 onto the junction, for example along the second roadway 258. By way of example, should vehicle 250 be detected as likely to pass through a "stop" signal or red light for roadway 254, then a "go" signal or green light for roadway 258 may be delayed by a suitable period, for example by ten seconds, to ensure that the junction is safe for traffic to enter from roadway 258.

Although in FIG. 9 the danger condition model 262 is illustrated as being part of the traffic monitor 30, it could of course be implemented within the traffic signal controller 210, distributed between the two, or in other ways.

FIG. 10 is a time—distance plot along a roadway of detected acoustic vibration, similar to that of FIG. 2, but for a situation corresponding to that shown in FIG. 9. In FIG. 10 a number of vehicles are evident, from their tracks in the acoustic signal, progressing along roadway 254 of FIG. 9 towards the stop line 270 at junction 252. The position of the stop line 270 is seen as a horizontal broken line in FIG. 10, beyond (above) which lies the road junction 252 labelled "JUNCTION". A traffic signal 260 for controlling access to the junction from roadway 254 turns from "green" (go) to "amber" (in transition) at the time point marked in FIG. 10 as "Amber", and from "amber" to "red" (stop) at the time point marked "Red".

A first vehicle 250 is seen by its acoustic track in FIG. 10 to approach the junction as the traffic signal turns to amber, and then instead of slowing down, this vehicle continues at an approximately constant speed, or even speeds up slightly, as it approaches the stop line 270. This first vehicle 250 is then seen to cross the stop line 270 at speed, and to proceed across the junction 252 beyond, after the traffic signal has already turned to red (stop), thereby entering the junction in contravention of the road traffic signals 260, and causing danger to other vehicles which may have already started to enter the junction legitimately.

The trajectory of the first vehicle 250 as it approaches the road junction may be monitored or tested to determine, as discussed above, whether it meets a danger condition (for example such a danger condition specified by a danger condition model 262), indicative that the vehicle is expected to cross the stop line 270 and enter the junction in contravention of at least one of the road traffic signals. Responsive to this determination, one or more of the road traffic signals may be controlled for other roadways and directions into the junction, for example to hold at red or stop for longer, thereby holding back waiting vehicles from those directions for longer so as to protect them from collision with the first vehicle 250.

More generally, the traffic monitor 30 may monitor a length x of roadway 254 in advance of the junction or stop line, during a particular time interval y such as between the the traffic signal turning to amber and then turning to red, and detect if any vehicle trajectory falling within that monitored length x of roadway in that time interval y is indicative of the corresponding vehicle meeting a suitable danger condition as described above. The danger condition model 262, or more generally the traffic monitor, may then be arranged particularly to monitor trajectories of vehicles which pass through the area of the graph of FIG. 10 shown as a stippled rectangle and which is defined by the spatial interval x and the time interval y.

FIG. 10 also shows how other vehicles following the first vehicle, seen as vehicle trajectories 251, slow down ahead of the junction in response to the red light, joining the back of a traffic queue 102 and waiting for the traffic light to change again to "green".

In another potentially dangerous situation, FIG. 11 illustrates a traffic queue 8 which has formed along a roadway 12 due to the presence of a stopped or stranded vehicle or other obstacle. A sensor as already described above comprises an interrogator unit 5 coupled to a sensing optical fibre 10 which extends along the roadway 12 in order to detect acoustic vibration generated by traffic on the roadway.

Also illustrated is a road traffic sign 280 which is arranged to display a warning to traffic which is travelling along the roadway, for example by specifically causing lights of the sign to flash, a particular graphic to be displayed, or in other ways. The road traffic sign 280 may be positioned adjacent to a part of the roadway monitored by the sensing optical fibre but this is not necessarily the case. The interrogator unit 5, or more particularly a traffic monitor element 30 of such an interrogator is arranged to pass data derived from acoustic vibration detected using the sensing optical fibre 10 to a road sign controller 285, which is arranged to automatically control one or more road traffic signs in response to the received data, in order to display a warning to traffic. In this way, one or more road traffic signs may be automatically controlled to display a warning to traffic dependent at least in part on the detected acoustic vibration.

More particularly, as illustrated in FIG. 11, the traffic monitor 30 may be arranged as discussed above to estimate one or more properties of a detected traffic queue 8, such as the presence, estimated boundaries and so forth of such as traffic queue, using techniques as discussed above, and on the basis of those properties, to cause the road traffic sign 280 to display a warning to traffic travelling along the roadway towards that traffic queue, for example towards a back boundary of that traffic queue. In some situations, such a traffic queue could be tangential or incidental onto the roadway of the warned traffic, for example a traffic queue may develop on a slip-road or on-ramp onto a roadway, and traffic earlier along the roadway is then warned of the traffic queue on the slip-road on on-ramp.

In some situations, such a traffic queue may be caused by a stranded or broken down vehicle 290, and the arrangement of FIG. 11 may then be arranged to automatically detect the presence of the stranded vehicle, for example at least in part using one or more estimated positions of boundaries of the queue of traffic. For example, a stranded vehicle could be in particular be detected by making use of a vehicle track derived from the detected acoustic signal as discussed above, where it is evident from automatic analysis that the particular vehicle giving rise to that track has not recently moved. FIG. 12 illustrates other ways in which an event or traffic incident such as a stranded or broken down vehicle 290 at a position along a roadway may be automatically detected using distributed acoustic sensing by the traffic monitor 30 depicted in previous figures, for example using a traffic incident detector of the traffic monitor automatically carrying out the detection method described below.

FIG. 12 is similar to FIG. 2, but in this case acoustic vibration tracks 300-1 . . . 300-3 of a plurality of vehicles are first seen passing a particular position P and continuing in the same direction along a roadway. However, after time t no further vehicle tracks are seen to pass position P, and instead a traffic queue forms, seen as the back 302 of a queue of traffic, thereby evidencing some kind of traffic incident occurring at or proximal to point P.

The detected incident giving rise to the traffic queue could for example be a broken down or otherwise stopped vehicle, a person or animal or accident involving the same in the roadway, a load shed from a vehicle, a fallen tree or piece of road structure, and so forth.

Because the vehicles corresponding to the tracks 300-1 . . . 300-4 pass the position P before the incident, they may be referred to as antecedent vehicles. Vehicles corresponding to tracks 304-1 . . . 304-6 arrive at position P after the incident, so may be referred to as subsequent vehicles. In this discussion, the vehicles forming these tracks are all travelling in the same direction along the roadway, and may be distinguished as such for example by suitable analysis of the acoustic signal, suitable positioning of the sensing optical fibre for sensitivity to vehicles travelling in this direction, or in other ways.

A clear indicator of the traffic incident proximal to point P is seen as an expanding and broadly triangular shaped gap where no vehicle tracks are seen in FIG. 12. This gap may be automatically detected by identifying tracks of precedent vehicles within sector A of the graph before the incident occurs, and identifying tracks of subsequent vehicles within sector B of the graph after the incident occurs, which stop at or before the incident position, or the relevant vehicle tracks can be detected without particular analysis or attribution to particular vehicles, for example by detecting an average drop in acoustic signal over an expanding length of the roadway, compared to sectors A and B, as depicted in sector C of the graph.

In particular, a traffic incident detector element of the traffic monitor may identify a reduction or absence of tracks of vehicles, or more generally in road noise corresponding to those tracks, in an expanding sector of the roadway subsequent to the incident, the sector expanding away from the position of the incident. More particularly, the expanding sector may be identified as expanding in both directions along the roadway, but expanding more rapidly in the direction of traffic along the roadway than in the opposite direction.

The characteristics of the acoustic signal as described above which may be used to identify and locate a traffic incident may be implemented using a traffic incident model within the traffic monitor or elsewhere.

In the described arrangements, a number of functional elements have been described which carry out data processing activities, such as the analyser 18, traffic monitor 30, traffic signal controller 210, and further computer systems 26 depicted in FIG. 1, sub components of the traffic monitor 30 illustrated in FIGS. 3 and 4, and more generally the interrogators, road traffic signal controller and road sign controller depicted in FIGS. 8, 9 and 11, as well as data processing elements required to carry out the processes and functions described in respect of the other figures. Although illustrated as being located in particular physical and/or logical relationships to each other and other aspects of the embodiments, computer implemented functionality of such elements can of course be located and distributed in various ways for example in or between various computer systems and in various locations, with such computer systems being suitably linked using data network connections and the like.

Such computer systems will typically comprise one or more suitable microprocessors, associated memory, suitable data input and output facilities, network connections and so forth. Where methods relating to data analysis are described herein, these will typically be implemented using computer program software executing on such computer systems, and the invention extends to such computer programs comprising software instructions, as well as to one or more computer readable media carrying such computer programs.

Although specific embodiments of the invention have been described with reference to the drawings, the skilled person will be aware that variations and modifications may be applied to these embodiments without departing from the scope of the invention defined in the claims. For example although determination or properties of traffic queues and vehicle properties using distributed acoustic sensing in particular has been described, the data derived from such distributed acoustic sensing may be combined with that from other data sources to further enhance determination of properties of traffic queues and vehicle properties, control of road traffic signals and signs and for other purposes. For example, such other data sources may include road traffic cameras, radar systems, induction loops and other road surface embedded detectors, data streams received from position tracking systems within the vehicles themselves, and so forth.

The invention claimed is:

1. A method of estimating a position of a boundary of a queue of traffic, the queue extending along a roadway, comprising:

using distributed acoustic sensing to generate, as a function of time and of position along the roadway, an acoustic signal representing acoustic vibration at a sensing optical fibre that extends along the roadway;

determining, by a composite movement detector, from the acoustic signal, composite movement data representing average traffic speed values of all vehicles for a plurality of locations along the roadway;

detecting, by a queue signature detector, in the composite movement data, a queue signature of either slowing down of the vehicles as they approach the boundary of the queue, or speeding up of the vehicles as they advance from the boundary of the queue by comparing a portion of the composite movement data with a plurality of queue boundary models, the queue boundary models defining patterns of speed change of vehicles approaching or advancing from the boundary of the queue, and determining that the portion of the composite movement data matches one of the plurality of queue boundary models;

estimating the position of the boundary of the queue of traffic from the detected queue signature; and based on the estimated position of the boundary of the queue of traffic, automatically controlling, by a road traffic signal controller, a road traffic sign to display a warning to traffic that is travelling along the roadway towards the estimated position of the boundary of the queue.

2. The method of claim 1, wherein the boundary is a back boundary of the queue, and the detected queue signature is a queue signature of the vehicles slowing down as they approach the back boundary, or the boundary is a front boundary of the queue, and the detected queue signature is a queue signature of the vehicles speeding up as they depart from the front boundary.

3. The method of claim 1, wherein detecting the queue signature comprises detecting properties of tracks of the vehicles within the acoustic signal, each track resulting from one vehicle slowing down as it approaches the boundary of the queue, or speeding up as it advances from the boundary of the queue.

4. The method of claim 3, wherein a plurality of the tracks terminate or become undetectable before the associated vehicles reach the boundary of the queue, or become detectable only after the associated vehicles have advanced from the boundary of the queue.

5. The method of claim 1, wherein estimating the position of the boundary of the queue comprises extrapolating the detected queue signature forwards to the boundary of the queue, or backwards to the boundary of the queue.

6. The method of claim 1, wherein the position of the boundary of the queue is estimated as a function of time to form an estimated trajectory of the boundary of the queue.

7. The method of claim 1, wherein the composite movement data is further determined by applying one or more filters to the acoustic signal.

8. The method of claim 1, wherein the queue boundary models further define patterns of similarity between tracks of vehicles approaching, or advancing from, the boundary of the queue, for a queue signature to be detected.

9. The method of claim 1, further comprising:

automatically detecting a presence of a stranded vehicle at least in part using the estimated position of the boundary of the queue of traffic, when the queue of traffic is caused by the stranded vehicle.

10. Apparatus for estimating a position of a boundary of a queue of traffic, the queue extending along a roadway, comprising:

an interrogator arranged to generate, as a function of time and of position along the roadway, an acoustic signal representing acoustic vibration at sensing optical fibers that extend along the roadway;

a composite movement detector arranged to determine, from the acoustic signal, composite movement data representing average traffic speed values of all vehicles for each of a plurality of locations along the roadway;

a queue signature detector arranged to detect, in the composite movement data, a queue signature of either slowing down of the vehicles as they approach a back boundary of the queue, or speeding up of the vehicles as they advance from a front boundary of the queue by comparing a portion of the composite movement data with queue boundary models, the queue boundary models defining patterns of speed change of vehicles approaching or advancing from the boundary of the queue, and determining that the portion of the composite movement data matches one of the plurality of queue boundary models;

a queue boundary estimator arranged to estimate the position of the boundary of the queue of traffic from the detected queue signature; and a road traffic signal controller arranged to, based on the estimated position of the boundary of the queue of traffic, control a road traffic sign to display a warning to traffic that is travelling along the roadway towards the estimated position of the boundary of the queue.

11. The apparatus of claim 10, further comprising: a track detector arranged to detect properties of tracks of the vehicles within the acoustic signal, each track resulting from one vehicle slowing down as it approaches the back boundary of the queue, or speeding up as it advances from the front boundary of the queue, and wherein a plurality of the tracks terminate or become undetectable before the associated vehicles reach the back boundary of the queue, or become detectable only after the associated vehicles have advanced from the front boundary of the queue.

12. The apparatus of claim 10, wherein the queue boundary estimator is arranged to estimate the position of the boundary of the queue using extrapolation of the detected queue signature forwards to the back boundary of the queue, or backwards to the front boundary of the queue.

13. A non-transitory computer readable medium storing instructions that when executed by a processor cause the processor to estimate a position of a boundary of a queue of traffic that extends along a roadway, comprising causing the processor to:

receive an acoustic signal representing acoustic vibration at a sensing optical fibre that extends along the roadway;

determine, from the acoustic signal, composite movement data representing average traffic speed values of all vehicles for a plurality of locations along the roadway;

detect, in the composite movement data, a queue signature of either slowing down of the vehicles as they approach the boundary of the queue, or speeding up of the vehicles as they advance from the boundary of the queue by comparing a portion of the composite movement data with queue boundary models, the queue boundary models defining patterns of speed change of vehicles approaching or advancing from the boundary of the queue, and determining that the portion of the composite movement data matches one of the plurality of queue boundary models;

estimate the position of the boundary of the queue of traffic from the detected queue signature; and based on the estimated position of the boundary of the queue of traffic, automatically control a road traffic sign to display a warning to traffic that is travelling along the roadway towards the estimated position of the boundary of the queue.

14. The non-transitory computer readable medium of claim 13, wherein the boundary of the queue is a back boundary of the queue, and the detected queue signature is a queue signature of the vehicles slowing down as they approach the back boundary, or the boundary of the queue is a front boundary of the queue, and the detected queue signature is a queue signature of the vehicles speeding up as they depart from the front boundary.

15. The non-transitory computer readable medium of claim 13, wherein the instructions further cause the processor to:

detect properties of tracks of the vehicles within the acoustic signal, each track resulting from one vehicle slowing down as it approaches the boundary of the queue, or speeding up as it advances from the boundary of the queue.

16. The non-transitory computer readable medium of claim 15, wherein a plurality of the tracks terminate or become undetectable before the associated vehicles reach the boundary of the queue, or become detectable only after the associated vehicles have advanced from the boundary of the queue.

17. The non-transitory computer readable medium of claim 16, wherein the instructions that cause the processor to estimate the position of the boundary of the queue comprises instructions that cause the processor to extrapolate the detected queue signature forwards to the boundary of the queue, or backwards to the boundary of the queue.

18. The non-transitory computer readable medium of claim 13, wherein the position of the boundary of the queue is estimated as a function of time to form an estimated trajectory of the boundary of the queue.

19. The non-transitory computer readable medium of claim 13, wherein, to determine the composite movement data, the instructions cause the processor to apply one or more filters to the acoustic signal.

20. The non-transitory computer readable medium of claim 13, wherein the composite movement data is further determined by applying one or more filters to the acoustic signal.

21. The non-transitory computer readable medium of claim 13, wherein the instructions further cause the processor to:

automatically detect a presence of a stranded vehicle at least in part using the estimated position of the boundary of the queue of traffic, wherein the queue of traffic is caused by the stranded vehicle.

* * * * *